United States Patent [19]
Fleischer et al.

[11] 3,863,993
[45] Feb. 4, 1975

[54] WHEEL BRAKING CONTROL SYSTEM

[75] Inventors: Helmut Fleischer, Schwieberdingen; Eberhard Schnaibel, Hemmingen; Werner Gotz, Friolzheim; Wolfgang Maisch, Schwieberdingen, all of Germany

[73] Assignee: Robert Bosch GmbH, Gerlingen-Schillerhohe, Germany

[22] Filed: Sept. 13, 1972

[21] Appl. No.: 288,791

[30] Foreign Application Priority Data
Sept. 18, 1971  Germany............................. 2146825

[52] U.S. Cl. ............ 303/21 BE, 303/20, 303/21 AF
[51] Int. Cl. ................................................. B60T 8/12
[58] Field of Search ................ 188/181; 303/20, 21; 324/161-162; 340/52 R, 53, 262-263

[56] References Cited
UNITED STATES PATENTS

| | | | |
|---|---|---|---|
| 3,017,145 | 1/1962 | Yarber............................. | 303/21 BE |
| 3,494,671 | 2/1970 | Slavin et al........................ | 303/21 P |
| 3,556,610 | 1/1971 | Lieber............................. | 303/21 P |
| 3,578,819 | 5/1971 | Atkins............................. | 303/21 P |
| 3,637,264 | 1/1972 | Leiber et al. .................... | 303/21 BE |
| 3,640,588 | 2/1972 | Carp et al........................ | 303/21 P |
| 3,642,339 | 2/1972 | Zechnall et al. ................ | 303/21 BE |
| 3,652,137 | 3/1972 | Fink et al........................ | 303/21 CG |
| 3,677,609 | 7/1972 | Davis et al....................... | 303/21 BE |
| 3,709,566 | 1/1973 | Michellone et al............ | 303/21 BE |

OTHER PUBLICATIONS
3,583,773     6/1971  Steinbrenner et al. 303/21 EB

*Primary Examiner*—Trygve M. Blix
*Assistant Examiner*—Stephen G. Kunin
*Attorney, Agent, or Firm*—Flynn & Frishauf

[57]  ABSTRACT

To prevent wheel locking, and buckling of the vehicle as wheel acceleration and deceleration are sensed and braking pressure is applied and released, a solenoid valve (21, 26) is placed in the pressure line to the wheel cylinder (23) to interrupt further application of brake fluid thereto, and a bleeder solenoid controlled valve (22, 27) is provided to bleed pressurized brake fluid from the cylinder. A group of at least four and preferably five threshold circuits are provided, responding to different conditions of wheel deceleration or acceleration. A storing circuit is connected to respond to a first threshold circuit to store information representative of wheel deceleration and control opening of the bleed valve solenoid when a certain deceleration, as stored, has been exceeded, the brake fluid control valve and bleeder valves opening, and closing, selectively (or cyclically) to provide essentially uniform deceleration of the brake wheel and the vehicle. An interlock circuit prevents simultaneous opening of the bleeder valve while brake fluid pressure is being applied to the brake cylinder.

61 Claims, 13 Drawing Figures

WHEEL BRAKING CONTROL SYSTEM

The present invention relates to a wheel braking control system, and more particularly to such a system which includes an anti-wheel lock arrangement, in which wheels are braked by means of a pressure fluid, typically a braking liquid. Various types of wheel anti-locking control systems have been proposed. Usually, a differentiator is provided which is customarily constructed as a simple R-C circuit. Further passive resistor-diode-capacitor networks may be used, with subsequent threshold circuits being provided to detect operating conditions of the wheels. In one arrangement, one threshold circuit is utilized to control a bleeder valve to bleed brake fluid from a brake cylinder, and another threshold circuit is used to control a pressure fluid supply valve to control application of pressurized brake fluid to the wheel cylinder.

Anit-locking braking systems, as proposed, permit three-condition control of the brake pressure. The brake pressure can be increased, it can be decreased, or it can be held constant. One of the passive networks is utilized to form a signal which is an analog of the circumferential wheel speed. The differentiator and the other passive network provide wheel acceleration and deceleration signals.

A three-condition control system can match the actual braking pressure to the temporal relationship of wheel speed, and change of wheel speed if the system can effect changes in pressure upon changes in wheel speed or changes in wheel rate of change of speed, that is, changes in wheel acceleration and deceleration. If such a wheel anti-lock system has three threshold switches, one of which does not respond to wheel rate of change of speed, but rather to wheel speed itself, then a substantial rate of change of wheel speed is required until the next threshold switch will respond. This results in a relatively large time lapse between changes in wheel speed and changes in braking pressure, which results in a substantial control amplitude, or swing of the brake pressure. This is disadvantageous, since large changes in braking pressure cause bucking of the vehicle, or sudden shaking thereof.

It is an object of the present invention to provide a wheel braking control system, and more particularly a wheel anti-lock control system which responds rapidly to changes in braking pressure upon change in wheel rate of change of speed. The control amplitude of the braking pressure should be reduced to such an extent that even under emergency braking conditions, the vehicle does not buck or shake. The wheel braking control system thus should function to simulate braking effect of a good driver - applying just so much braking pressure that the wheels will not lock, so that the vehicle will not skid, yet do so smoothly and without jarring or shaking or causing a sensation of interrupted sudden braking and release of braking effort.

SUBJECT MATTER OF THE PRESENT INVENTION

Briefly, a group of at least four threshold circuits are provided, connected to sense rate of change of a wheel, that is, connected to a differentiator differentiating wheel speed. One of the threshold circuits is responsive to wheel deceleration; it is connected to a storage circuit to store information relative to wheel deceleration. The storage circuit is connected to another one of the threshold circuits to terminate storage of wheel decelerating information. The storage circuit is connected to control a solenoid valve which bleeds brake fluid from the brake cylinder. An interlock circuit is provided to prevent feed of brake fluid from a pressurized brake fluid supply to the brake cylinder when the bleed valve is open.

All four threshold circuits are connected to the differentiator, and all respond to rate of change of speed signals, the four threshold circuits selectively controlling the interplay of opening and closing of the brake control valve (admitting pressurized brake fluid or bleeding pressurized brake fluid) so that the change in pressure being applied to the wheel brake will be readily matched to the change in wheel speed.

In the specification which follows, the rate of change of speed will be termed negative change when the wheel decelerates; whereas rate of change in a positive correction corresponds to acceleration. Deceleration may, therefore, also be termed "negative acceleration."

In accordance with the present invention, the bleeder valve is not controlled directly by the threshold circuits but rather over a storage circuit. The bleeder valve is thus opened when a threshold circuit responds and closes again when another threshold circuit responds. This provision permits a controllable, adjustable hysteresis of the switching of the bleeder valve. Further, changing the threshold value of one threshold switch does not change the threshold values of the others. The wheel braking control system can therefore easily be matched to any desired vehicle. The system has the additional advantage that the storage device may be formed as a monostable multivibrator which re-sets after a predetermined period of time by itself, if a second threshold switch has not, in the meanwhile, responded, so that a re-set signal has been missing. This substantially increase the reliability and safety of the device.

The wheel braking system can be additionally improved by utilizing a fifth threshold switch which is also connected to the output of the differentiating network and which responds to a small negative value of wheel acceleration (slight deceleration). Such a fifth threshold switch preferably controls interruption of the pressurized brake fluid valve so that, even relatively small wheel decelerations can be utilized to hold the braking pressure at a constant value.

The invention will be described by way of example with reference to the accompanying drawings, wherein.

Figure 1:
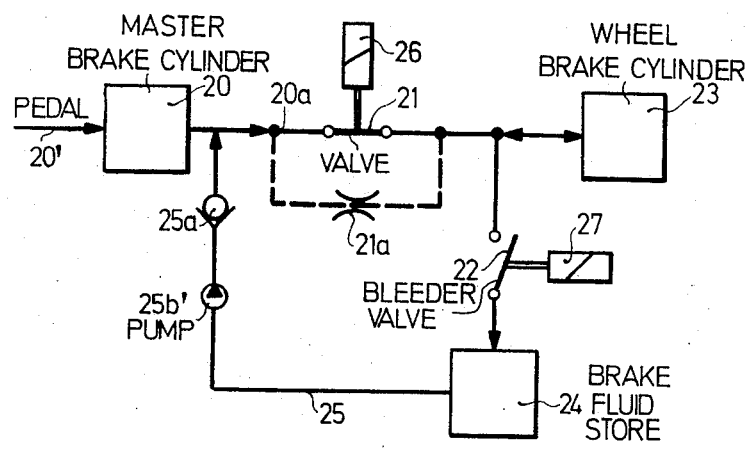
FIG. 1 is a schematic diagram of the hydraulic circuit of the braking control system.

The braking system of FIG. 1 illustrates a main or master brake cylinder 20 and a wheel brake cylinder 23. One master brake cylinder may supply pressurized brake fluid, typically brake oil or the like, to more than one wheel brake cylinder. The master brake cylinder 20 is operated for example by means of a brake pedal, schematically shown as force arrow 20′, so that pressure will be built up in the master cylinder. Brake fluid flows over line 20a to the brake cylinder 23. An electromagnetically, solenoid-operated valve 21, with an energizing solenoid coil 26 is interposed in the line 20a. Adjacent brake cylinder 23, a bleeder branch line branches off, in which a solenoid-operated valve 22 having an energizing coil 27 is included. Brake fluid thus may flow from the brake cylinder 23 through the bleeder valve 22, when the valve is opened, and will flow into a brake fluid storage vessel 24, from which it is taken by a pump 25b, through a check valve 25a back to the line 20a or the master cylinder 20. Valve 21 can be bridged by a choke or throttled line 21a, as indicated in dashed connections in FIG. 1.

When the valves are in the position shown in FIG. 1, the braking system operates like any well known conventional vehicle braking system. Pressure fluid can be applied from master cylinder 20 through line 20a, valve 21, to the wheel brake cylinder 23 and, upon release of the pedal 20′, can flow back to the master cylinder. A piston, movable within the cylinder 23 operates the brake shoes. The pressure in the cylinder 23 is equal to the pressure in the master cylinder 20 and can be increased upon increase of pedal pressure 20′. A power brake arrangement, or servo may be substituted for the pedal 20′ so that the pressure applied to the brake cylinder 23 can be independent of actual pedal pressure, or the pedal 20′ can control application of pressurized brake fluid, for example derived from pump 25b to line 20a.

Figure 2:
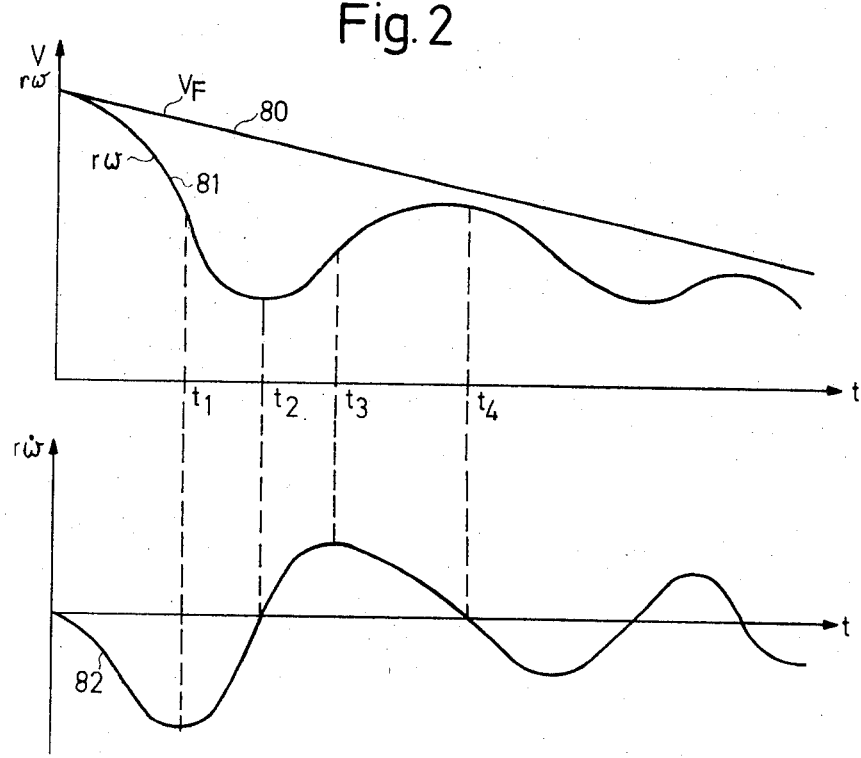
FIG. 2 is a graph illustrating the operation of the vehicle brake control system.

Upon energization of winding 26 of valve 21, the valve 21 will be interrupted or blocked, that is, the valve will be closed, so that the pressure in the wheel cylinder 23 will remain constant - assuming valve 22 to remain in the position shown. If the throttle 21a and the throttle line are provided, then, in such position of the valves, brake pressure will rise slowly. Even if the brake pedal is operated, the pressure in the wheel cylinder 23 can be decreased by operating solenoid valve 27 and opening valve 22 to permit bleeding of brake fluid from the cylinder 23. Upon such change in the valve position of valve 22, excess pressure fluid is returned to the storage vessel 24. The brake fluid is lost from the main brake cylinder 20 is replaced by the return pump 25b, as well known in the art. FIG. 2 shows the temporal relationship of vehicle speed $V_F$, the circumferential speed of a wheel under consideration, $r\omega$, and wheel rate of change of speed (positive and negative acceleration) $r\dot\omega$. Two control cycles are illustrated. It is assumed that the road conditions remain constant, and that vehicle speed $V_F$ decreases at a constant rate.

Wheel circumferential speed indicated by curve 81 decreases more rapidly than vehicle speed indicated by curve 80 when the braking effort is extreme and the optimum braking has been exceeded, that is, the wheel skids or slips with respect to road surface. At time $t_1$, the greatest decrease in wheel deceleration 82 has been reached. To prevent excessive skidding and wheel locking, the bleeder valve 22 must now open so that the braking pressure can be decreased, causing a decrease in the wheel deceleration 82 until the time $t_2$ has been reached. At time $t_2$, wheel circumferential speed 81 has reached its minimum value and increases until time $t_4$, causing relative acceleration of the wheel (with respect to vehicle speed), the wheel having a maximum acceleration at time $t_3$. At time $t_4$, at the latest, the braking pressure must be increased again by closing of the bleeder valve 22 and opening of the brake valve 21, so that wheel circumferential speed (curve 81) does not rise to the value of vehicle speed (curve 80), so that the wheel idles along with the vehicle. The control cycle, as described, will continue once more after time $t_4$.

Figure 3:
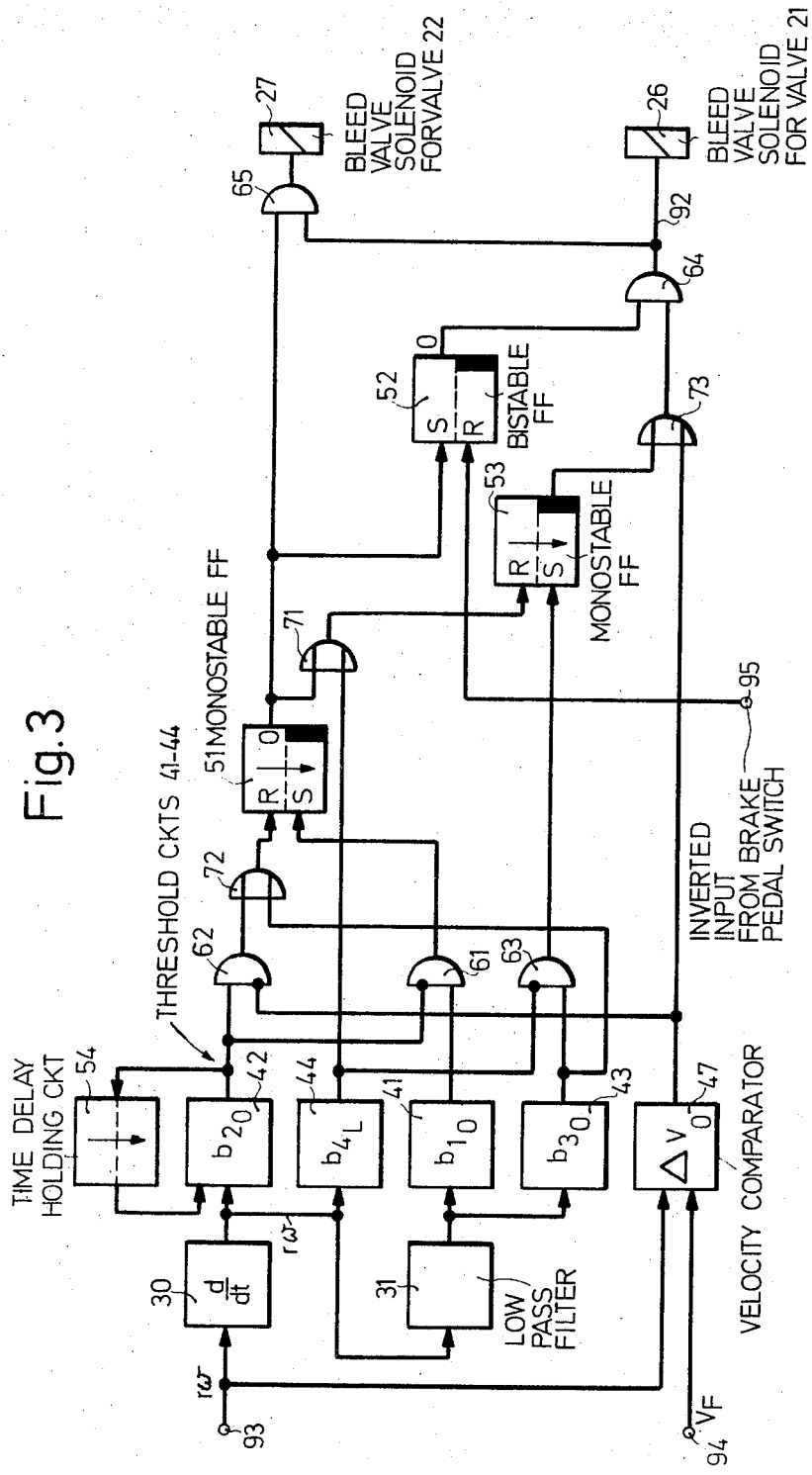
FIG. 3 is a schematic block diagram of a first embodiment of the invention.

The wheel anti-lock braking system in accordance with the present invention is illustrated in block diagram form in FIG. 3, which is assumed to be used with the system of FIG. 1. The bleed valve solenoid 27 and the brake valve solenoid 26 are illustrated.

Figure 13:
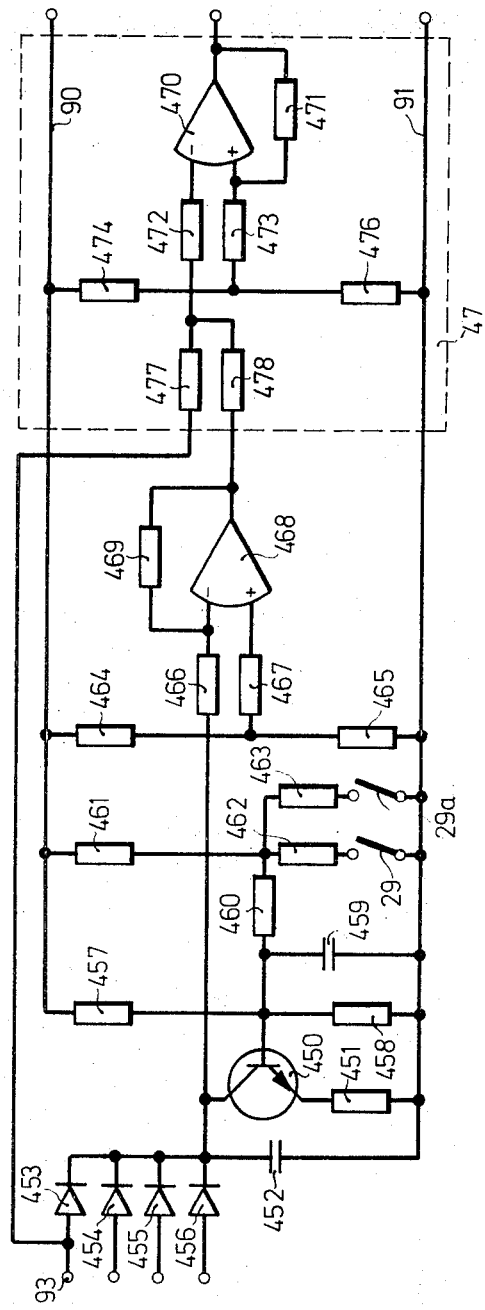
FIG. 13 is a schematic circuit diagram of a speed comparator circuit.

The circuit has three input terminals 93, 94, 95. Input terminal 93 is connected to a tachometer generator or other apparatus which provides an output signal, preferably a d-c voltage representative of circumferential wheel speed $r\omega$. Such wheel speed indicators are customary in wheel anti-lock systems and preferably include a pulse source providing output pulses at a pulse repetition rate representative of wheel speed, and a frequency-voltage conversion circuit to provide a d-c output signal. The second input terminal 94 provides a signal representative of vehicle speed $V_F$. The diagram of the circuit of such a page therefor is illustrated in FIG. 13 and will be described in detail below. The third input terminal 95 is connected to the customary brake light switch of the vehicle braking system and provides a signal when the brake is not operated, that is, when the brake is released, for example by being connected to the brake light circuit over an inverter.

A velocity comparator circuit 47 is provided which includes a threshold circuit connected with one input to the first terminal 93 and with a second input to the second terminal 94. The output of velocity comparator 47 provides a signal representative of the difference between the speed of the wheel under consideration and the speed of the vehicle. The first input terminal 93 further has the input of the differentiator circuit 30 connected thereto. The output of differentiator 30 is connected to a second threshold circuit 42 and the fourth threshold circuit 44, and to a low-pass filter 31. The output of low-pass filter 31 is connected to a first threshold 41 and a third threshold circuit 43. The output of the second threshold circuit 42 is connected over a timed holding circuit 54 with a second input of the second threshold circuit 42.

The outputs of first and second threshold circuits 41, 42 are connected over an AND-gate 61 to the set input S of a first storage device 51. Storage device 51 is a monostable flip-flop having an unstable time of about 200 milli-seconds (msec). The various gates may have inverted inputs, or outputs, which are indicated by dots, the input to AND-gate 61 from second threshold circuit 42 being over an inverting input.

The outputs of the second threshold circuit 42 and the speed comparator circuit 47 are connected over an AND-gate 62 with the first input of an OR-gate 72, the second input of which is connected to the output of the third threshold circuit 43. The output of OR-gate 72 is connected to the reset input R of the first storage device or flip-flop 51. The output of flip-flop 51 is connected to the set input S of a bistable flip-flop 52, forming a second storage device. The third input terminal 95, from the brake light switch, is connected to the re-set terminal R of storage device 52.

The third threshold switch 43 and the fourth threshold switch 44 are connected over an AND-gate 63 with the set terminal S of a third storage device 53, the re-set terminal R of which being connected to the output of the fourth threshold switch 44 and of the first storage flip-flop 51 over an OR-gate 71. The third storage device or memory 53, like the first memory 51 is formed as a monostable flip-flop having a storage time of about 200 msec.

The outputs of the speed comparator circuit 47 and of the third memory 53 are connected over an OR-gate 73 with the first input of an AND-gate 64, the second input of which is connected to the output of the second memory 52. The output of the AND-gate 64 is connected over a line 92 to the energizing winding 26 of the brake valve solenoid; it is additionally connected to one input of an AND-gate 65, the output of which controls the energization of the bleed valve solenoid 27. The other input of AND-gate 65 is connected to the output of the monostable flip-flop 51 forming the first memory.

The embodiment of the invention according to FIG. 1 requires the throttle line 21a. Otherwise, blocking pressure could possibly not be achieved anymore and yet the wheel could not be accelerated. Braking would thus occur at a pressure which is too low, and thus braking effort could be lost, resulting in an excessively long braking distance. This might happen, particularly, if during the braking action, wheel friction with respect to the road increases, resulting in better traction and thus better braking.

Figure 4:
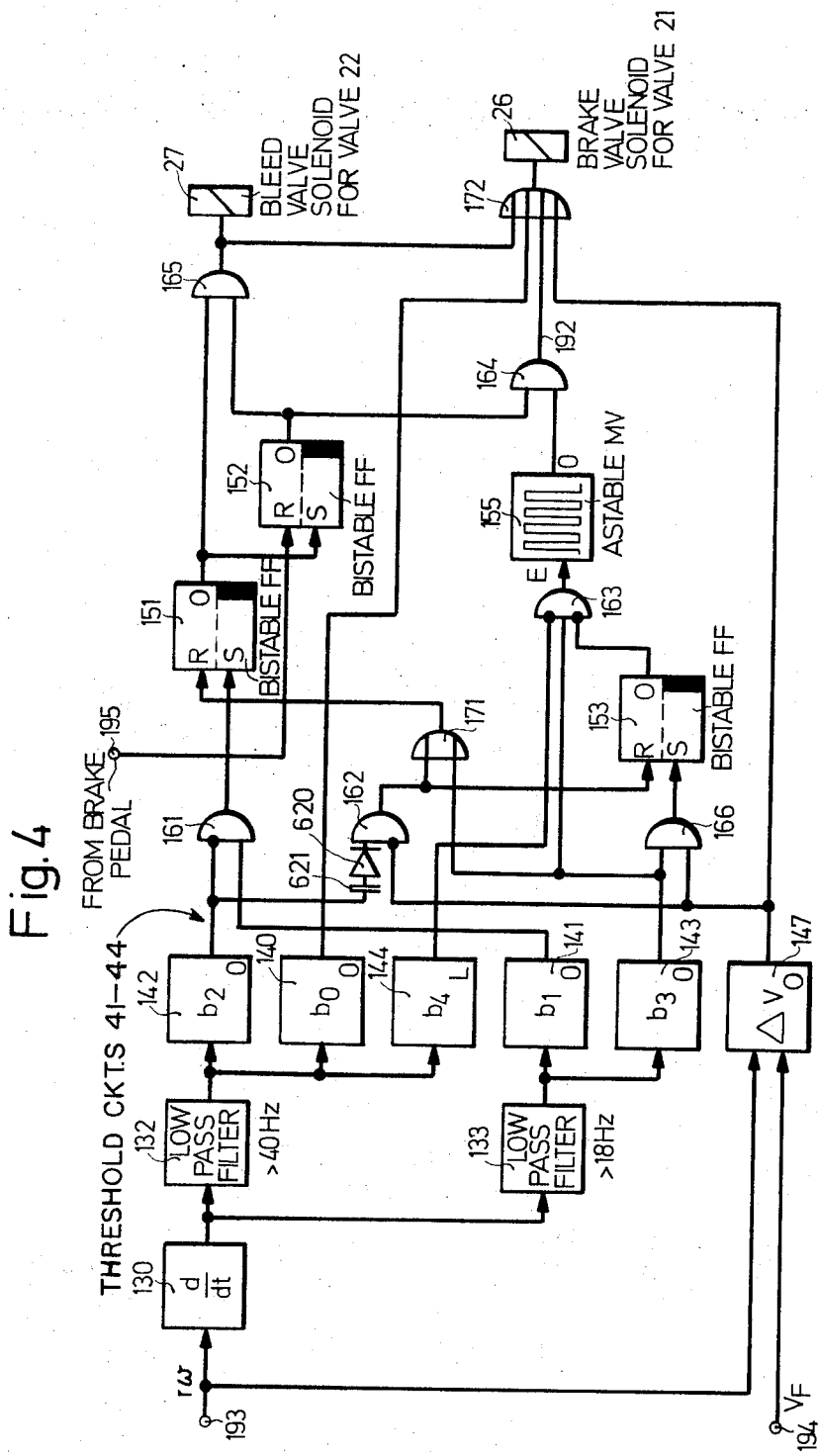
FIG. 4 is a schematic block diagram of a second embodiment of the invention.
Figure 5:
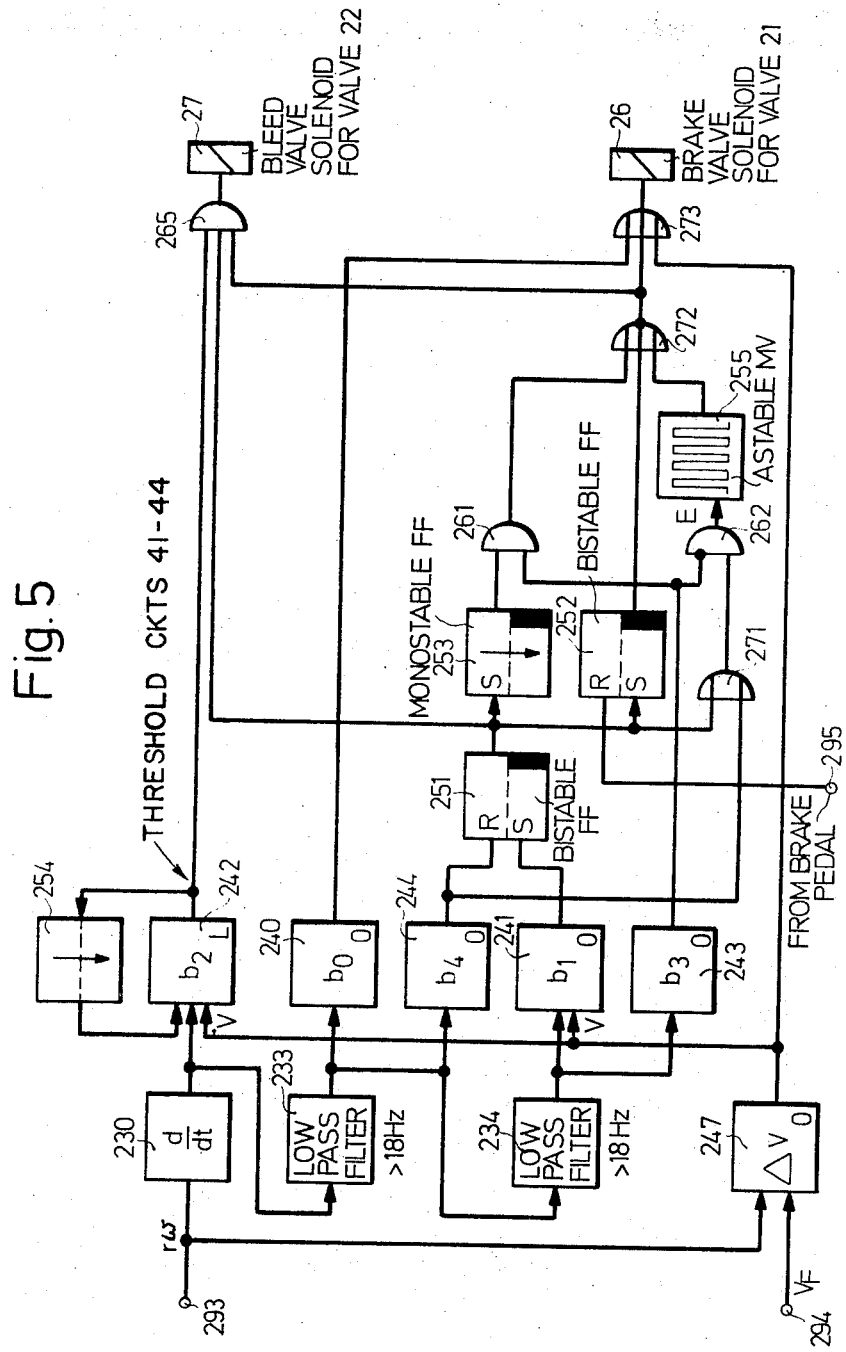
FIG. 5 is a schematic block diagram of a third embodiment of the invention.

The operation of the system will be described with reference to customary digital rotation: the output of a stage provides a 1 (ONE) signal when it is at positive voltage; it provides a 0 (ZERO) signal when it is at ground or chassis potential. The signals indicated in FIGS. 3–5 are those which the various stages have when the circuit is in quiescent condition. As unit for acceleration, gravity is utilized, that is, acceleration of $1g = 10$ m/s$^2$ is used. 1g happens to be that deceleration which, under optimum braking conditions, can be obtained with an ordinary motor vehicle.

Figure 6:
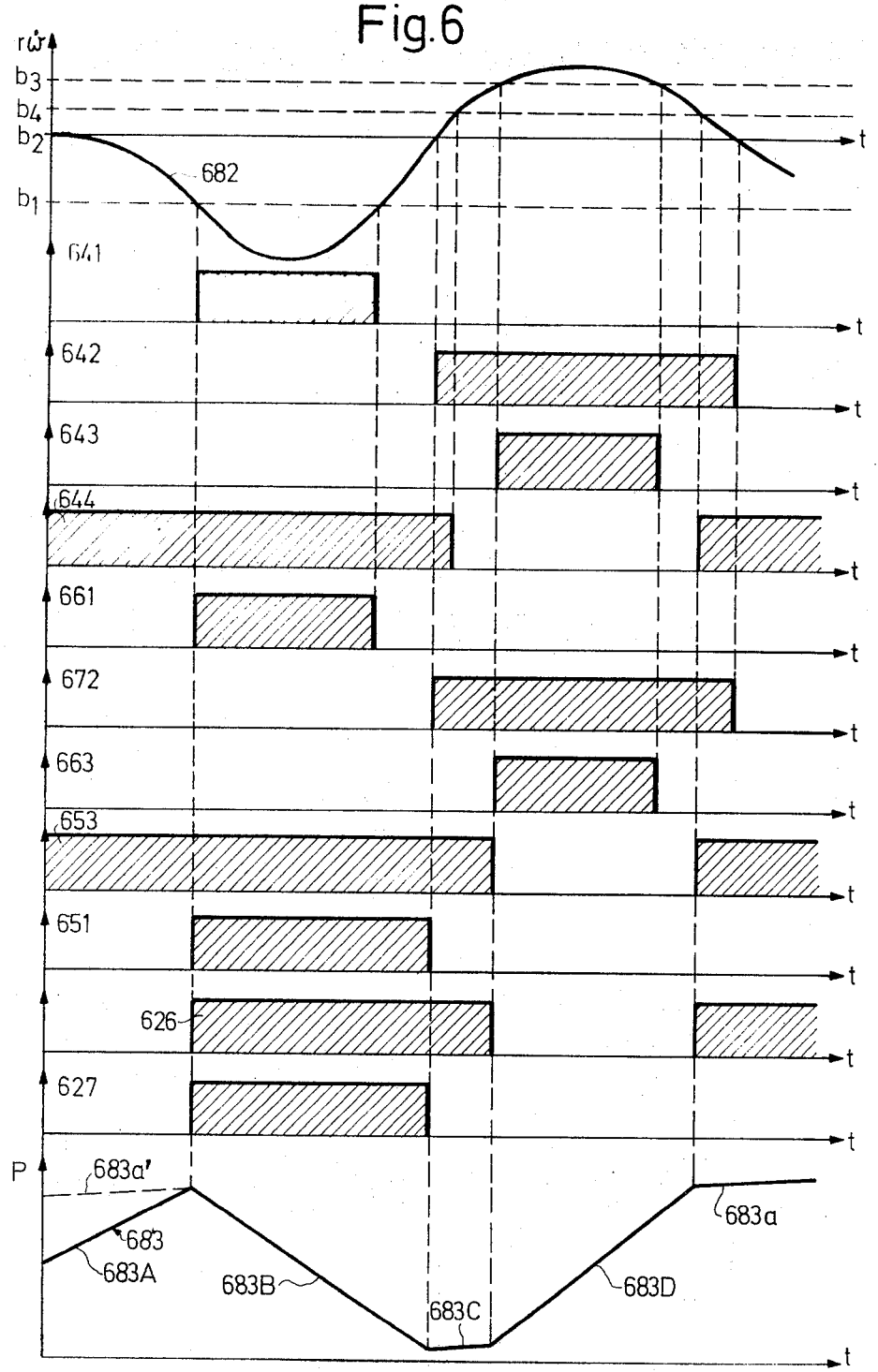
FIG. 6 is a series of graphs illustrating the operation of the first embodiment of FIG. 3.

The threshold circuits referred to in FIG. 3 preferably are set to about the following threshold values:

threshold circuit 41 ... $b_1 = -3g$
threshold circuit 42 ... $b_2 = 0$
threshold circuit 43 ... $b_3 = +2g$
threshold circuit 44 ... $b_4 = +1g$ Operation of embodiment of FIG. 1, with reference to FIG. 6: FIG. 6 illustrates, in curve 682, wheel acceleration, with respect to time, during a first control cycle. The subsequent pulse diagrams illustrate, in sequence, the output pulses of the first threshold switch 41, the second, third and fourth threshold switches 42, 43, 44, of the AND-gate 61, OR-gate 72, AND-gate 63, the third memory 53 and the first memory 51. The input voltages of the two solenoid windings 26 and 27 are also illustrated, the respective lines of the graphs corresponding to the reference numerals in FIG. 3 plus 600. The braking pressure applied to the wheel brake cylinder 23 is illustrated in curve 683 at the bottom of the diagram.

At the beginning of braking, brake pressure rises in accordance with portion 683A. This increases the deceleration of the wheel as seen in curve 682, until the threshold value $b_1$ (−3g) is reached and the first threshold switch 41 responds, so that the first threshold switch 41 provides a 1 signal. The second threshold switch 42 provides a 0 signal which is applied to the inverted input of the AND-gate 61, so that AND-gate 61 will provide a 1 input to the set terminal S of the first memory 51, which is thus set into its unstable state and provides a 1 signal at its output. The output of the first memory 51 is applied to the second memory 52 to set memory 52, and to the re-set terminal of the third memory 53 over OR-gate 71. Both memories 52 and 53 will now have a 1 signal at their outputs. Both AND-gates 64 and 65 will provide a 1 signal, so that both solenoid windings 26 and 27 are energized. Valve 21 closes and valve 22 opens, and the pressure $p$ will decrease as seen in curve portion 683B.

The deceleration of the wheel, curve 682, increases only slightly and then decreases again until the switching threshold $b_1$ of the first threshold switch is again crossed, and threshold circuit 41 returns to its normal state providing a 0 signal. Threshold switch 41 is not, however, connected to any re-set input terminal and thus the memory circuits retain their previous state. The valves, likewise, retain their previous state. The slope of curve 683B thus continues as before (compare curve portion 683B and terminal pulse at line 641).

When the wheel rate-of-change curve 682 passes through 0, the second threshold switch 42 will respond and provide a 1 signal, so that the first memory 51 is re-set by a signal over the AND-gate 62 and OR-gate 72. The inlet valve 21 remains closed; the outlet valve is now likewise closed and brake pressure $p$ slowly increases due to the presence of the throttle line 21a - as seen in curve portion 683C.

If the wheel continues to accelerate, the fourth threshold switch 44 will re-set to a 0 signal. This does not, at this time, affect any memory, and thus any one valve. If, however, additional acceleration of the wheel causes the threshold $b_3$ of the third threshold switch 43 to be exceeded, so that it provides a 1 signal at its output, then the third memory 53 is set over its set terminal S into the unstable state, providing a 0 signal at its output. This interrupts energization of the magnet winding 26 so that inlet valve 21 will be opened again and brake pressure $p$ can rise rapidly, see curve portion 683D.

Increase of braking pressure $p$ can cause only little acceleration of the wheel and, subsequently, it is again retarded, or decelerated, and the next switching cycle starts. It, however, starts only when the threshold value $b_4$ of the fourth threshold circuit 44 is crossed, so that it will have a 1 signal at its output. This 1 signal re-sets the third memory 53 over OR-gate 71, again closing valve 21 by energizing solenoid 26. Braking pressure $p$ slowly rises, by being applied over throttle line 21a, as seen in curve portion 683a, since the bleeder valve is likewise closed or blocked. This pressure change corresponds also to the pressure as indicated in dashed line 683a' at the beginning of the curve 683. The pressure change 683a' occurs at all subsequent control cycles - only the first application of braking pressure causes the portion of the braking pressure to rise rapidly as seen at section 683A. Thus, if any control cycle, at random, is looked at, the initial braking pressure will be as indicated in portion 683a or 683a'; the first rapid pressure rise as indicated in portion 683A resulted only since the second memory 52 was not yet set at the begin of the braking operation.

The braking cycle repeats periodically in the following phases: slow pressure rise, pressure drop, slow pressure rise, rapid pressure rise, slow pressure rise, pressure drop, . . . etc.

Function of system components: differentiator 30 provides an acceleration (deceleration) signal. Its signal is subject, however, to spurious noise voltages. Since the differentiator, in any event, includes a differentiating condenser, short time spurious voltage peaks are passed thereby without filtering. Low-pass filter 31 removes the spurious voltage peaks from the output signal of differentiator 30. Filtering, however, introduces a time delay. The first and the third threshold circuits therefore receive a filtered signal with time dealy; the second and the fourth threshold circuits 42, 44 receive an undelayed, but unfiltered signal. The first threshold circuit 41 controls pressure drop; the third threshold circuit 43 controls rapid pressure increase. The second and the fourth threshold circuits 42, 44 control slow pressure increase. The arrangement of low-pass filter 31 is thus such that fast pressure changes are initiated with time delay, and are terminated without time delay. This provides for high operating reliability of the control system, since a change from rapid pressure rise to slow pressure rise, caused for example by a spurious voltage peak can be corrected again with merely the time delay introduced by the low-pass filter. On the other hand, however, rapid changes in pressure are terminated reliably, so that high control amplitudes are avoided. This results in soft, or smooth braking, without bucking of the vehicle. If the road conditions change, for example from slippery to high friction conditions, or vice versa, the time delay of the low-pass filter 31 might have a negative effect, since switch-over triggered by one of the threshold circuits 42, 44 might overtake switch-over to be controlled by threshold switches 41, 43. This is undesirable, and has to be avoided; the two AND-gates 61, 63 reliably prevent overtaking of switch conditions.

If the road surface is very smooth, for example under glare-ice conditions, the situation may arise that the wheel is decelerated up to almost stopped, or locked state, before the first threshold switch 41 responds and the pressure is decreased. The wheel then can again accelerate, yet the switching threshold level $b_3$ will be reached at a time when the speed of the wheel is still substantially less than that of the vehicle. If this control cycle would repeat, the wheel would come to a complete stop after three to four cycles - the condition which should be prevented by an anti-wheel lock system. Such stopping or locking of the wheel is reliably avoided by use of the speed comparison circuit 47.

The structure and exact operation of the speed comparison circuit 47 will be described below in connection with FIG. 13. In operation, however, the difference between vehicle speed and circumferential speed of a specific wheel is sensed and, when this difference exceeds a predetermined limiting value, the speed comparison circuit 47 provides a 1 signal at its output. This signal blocks the brake valve 21 over OR-gate 73, so that pressure cannot increase any further; secondly, AND-gate 63 can no longer provide a 1 signal, so that the first memory 51 will not re-set at the threshold level $b_2$, but rather only at the threshold level $b_3$. The re-set pulse, in this case, is thus provided by the third threshold switch 43 over OR-gate 72. Thus, brake pressure $p$ is decreased for a longer period of time.

OR-gate 71 ensures that the third memory 53 is re-set when the first memory 51 is set, so that pressure will decrease without considering the instantaneous switching pattern of the various circuits. The first memory 51, generally, controls the bleeder valve; the third memory 53, generally, controls the brake fluid inlet valve. The second memory 52 is set only when the first threshold switch 51 responds; it is re-set when the brake pedal is released. The re-set input R, to this end, is connected with the brake light switch over input terminal 95. The second memory 52 ensures that the brake pressure $p$ will be in accordance with curve 683 upon first application of the brake pedal, and then, upon subsequent control cycles, to follow initially in accordance with the curve portion 683a' (that is, 683a at the terminal end).

AND-gate 65 ensures that the bleeder valve 22 can be opened only when the brake valve 21 is closed, that is, prevents re-circulation of brake fluid directly from the inlet valve to the outlet valve into the brake fluid storage vessel 24. If this gate were not provided, malfunction might cuase mere re-circulation of brake fluid.

The holding circuit 54 connects the input of the second threshold switch 42 to ground, or chassis potential for about 20 msec., when the output has changed from 0 to 1. Since the second threshold switch 42 receives unfiltered output voltage from differentiator 30 at its input, the first storage or memory circuit 51 could set and re-set rapidly due to spurious voltage pulses, either over AND-gate 61 or over AND-gate 62 and OR-gate 72. Such rapid changes would result in undesired swings of the control system.

Embodiment of FIG. 4: The system in accordance with FIG. 4 has, in part, similar components as that of FIG. 3 and these parts have been given reference numerals which are increased by 100 with respect to the reference numerals of FIG. 3, and will not be described again in detail.

A first low-pass filter 132 and a second low-pass filter 133 are both connected to differentiator 130. First low-pass filter 132 has an upper pass frequency of about 40 Hz; the second low-pass filter has an upper limiting frequency of about 18 Hz. As a result, the delay time of the second low-pass filter is greater than that of the first low-pass filter 132. The output of the first low-pass filter 132 is connected to the second threshold switch 142, the fourth threshold switch 144 and a fifth threshold switch 140. The switching threshold $b_0$ of the fifth threshold switch 140 is preferably placed to respond to small negative values of the acceleration, that is, to a deceleration of about 2g. The other threshold circuits have the threshold levels set as in the first example discussed in connection with FIG. 3.

The inputs of the first threshold switch 141 and the third threshold switch 143 are connected to the output of the second low-pass filter 133. The output of the first threshold switch 141 and of the second threshold switch 142 are connected over an AND-gate 161 with the set input S of the first memory 151. Similarly, the outputs of the third threshold switch 143 and of the speed comparator 147 are connected to an AND-gate 166 to the set input of the third memory 153. The input of the AND-gate 162 has one terminal connected to the output of the speed comparator 147. The other input terminal of AND-gate 162 includes a dynamic input, that is, a series circuit of a capacitor 621 and a diode 620. This dynamic input is connected to the output of the second threshold switch 142. The output of AND-gate 162 is connected first over the re-set input R of the third memory 153 and additionally to one input of an OR-gate 171. The other input of the OR-gate 171 is connected to the output of the third threshold switch 143. The output of the OR-gate 171 controls the re-set input R of the first memory 151.

AND-gate 163 has three inputs, which are connected respectively to the outputs of the threshold switches 143, 144, and of the third memory 153. The output of AND-gate 163 is connected to a blocking impulse E of an astable multivibrator 155, which is blocked, and thus provides a 0 signal at its output if the blocking input E has a 1 signal applied thereto. If, however, the blocking input E has a 0 signal, then the astable multivibrator 155 provides clock output pulses for the solenoid winding 26 of the input valve 21.

The second memory 152 has its set input S connected to the output of the first memory 151, just as in the example of FIG. 3. Its re-set input R is connected to the third input terminal 195. AND-gate 164 has one input terminal connected to the output of the second memory 152 and another to the output of the astable multivibrator 155. The solenoid winding 27 of the bleeder valve 22 is connected over an AND-gate 165, having two inputs, one connected to the output of the first memory 151 and the other to that of memory 152. Similarly, solenoid winding 26 of the brake fluid inlet valve 21 is connected over an OR-gate 174 with four inputs, which are respectively connected to the outputs of the fifth threshold switch 140, the speed comparator circuit 147, AND-gate 164, and AND-gate 165.

Figure 7:
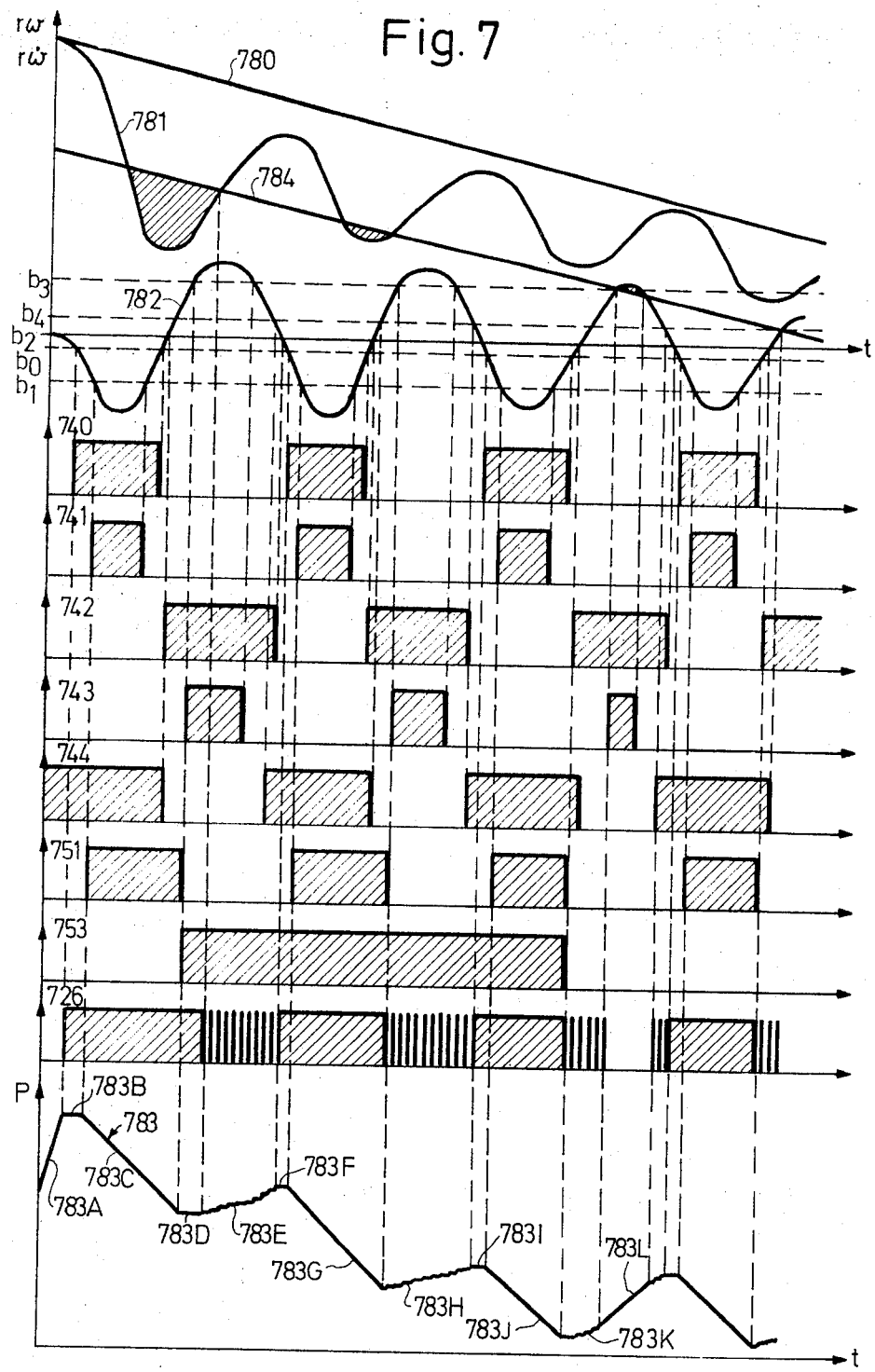
FIG. 7 is a series of graphs illustrating the operation of the second embodiment of FIG. 4.

As can be seen from FIG. 7, the embodiment in accordance with FIG. 4 provides four conditions of pressure for the brake, rather than three (as in the embodiment of FIG. 3), viz.: pressure drop; constant pressure maintenance; slow pressure rise; rapid pressure rise.

Slow pressure rise is obtained by repetitive opening of inlet valve 21 when bleeder valve 22 is closed, the repetition rate and opening time being established by the oscillations of the astable multivibrator 155. The four different pressure changes provide for even improved softness and smoothness of control, and even lesser control amplitude than with the example of FIG. 3, requiring, however, somewhat more complex circuitry.

The first three control cycles, upon braking on a very slick road, are illustrated. Let it be assumed that the road condition remains constant throughout the braking distance, so that the decrease in vehicle speed will be linear, in accordance with the graph line 780. A line 784 has been drawn parallel to line 780 which indicates the threshold value of the speed difference at which the speed comparison circuit 147 responds. Speed comparison circuit 147 provides a 1 signal during those periods of time which are indicated in FIG. 7 in the cross-hatched areas between curve 781 and 784.

Curve 782 represents wheel acceleration. The pulse diagrams in FIG. 7 illustrate, in this sequence, the output signals of the fifth threshold switch 140 (all line reference numerals again being incremented by 600 over the corresponding component in FIG. 4), that of the first threshold switch 141, of the second 142, of the third 143, of the fourth 144, of first memory 151 and of third memory 153, and are indicated at 740 to 753. The graph 726 illustrates the pulse sequence of the input signals to solenoid winding 26 of the inlet valve. Curve 783, overall, illustrates the brake pressure $p$ with respect to time $t$. The cross-hatched portions indicate those times during which the outputs have a 1 signal.

Curve section 783A, FIG. 7, illustrates rise in brake pressure $p$, upon start of braking. This rise is steep. Wheel speed rapidly decreases in accordance with curve 781, the deceleration increasing in accordance with curve 782. The fifth threshold switch, added to the embodiment of FIG. 3, has a threshold level $b_0$ at relatively low deceleration. The fifth threshold switch thus ensures that when the wheel deceleration is about 2g, which is above that of the overall vehicle deceleration which can be obtained at best, the inlet solenoid 21 will operate, in any event, by being energized from solenoid 26, over OR-gate 172, so that brake pressure $p$ cannot rise any further, as indicated at curve section 783B.

The braking sequence illustrated in FIG. 7 assumes - as noted above - that the vehicle is operating on a very slick or slippery surface as it is being braked. The braking deceleration of the wheel thus increases, even though the brake pressure $p$ is held constant, and will reach the threshold value $b_1$ of the first threshold switch 141. Since threshold switch 142 continues to provide a 0 signal, response of the first threshold switch 141 will cause the first memory 151 to be set over the AND-gate 161, so that its output will have a 1 signal. This 1 signal will set also the second memory 152 and further cause opening of the bleeder valve 22 over the AND-gate 165. Thus, after the first threshold switch 141 has responded, brake pressure $p$ decreases repidly, as indicated in curve section 783C.

Due to the smooth or slippery road surface (as assumed) the wheel deceleration continues to increase, and the circumferential speed of the wheel will become so small that the response threshold of the speed comparator 147 will be exceeded. The inputs of AND-gates 162, 166, connected to the output of the speed comparison circuit 147 will now have a 1 signal applied thereto. Likewise, the OR-gate 172 will have a 1 signal applied. Braking pressure $p$ continues to decrease rapidly. The wheel deceleration thus decreases and becomes ZERO. The switching threshold of the speed comparison circuit 147, however, continues to remain exceeded, and the inlet valve 21 cannot be opened again, even if the threshold switch $b_0$ has its threshold level exceeded in the positive direction. Only when the threshold level $b_3$ of the third threshold switch 143 is exceeded, that is, only after extensive acceleration of the wheel has again been ensured, can the first memory 151 be re-set over the OR-gate 171, so that the outlet valve 22 can be closed again. Braking pressure $p$ thus remains constant since the inlet valve 26 has not yet been closed, as indicated in curve portion 783D.

When the third threshold switch 143 responds, speed comparison circuit 147 still provides a 1 signal. Thus, the AND-gate 166 provides a set signal to memory 153, so that its output will have a 1 signal. As the wheel continues to accelerate, that is, accelerate in a positive direction, the response threshold level of the speed comparison circuit 147 will be passed again, and inlet valve 22 could be opened by solenoid winding 26, since neither the fifth threshold switch 140, nor the speed comparison circuit 147 has a 1 signal. This, however, would be undesirable on a slippery road, and to prevent such rapid pressure rise, the multivibrator 155 is provided. It can be blocked only when the fourth threshold switch 144 and the third memory 153 have a 0 signal, and the third threshold switch 143 a 1 signal, all of them being applied to the AND-gate 163. The third threshold switch 153 has, however, just been set. Thus, the astable multivibrator 155 is not blocked and provides output pulses to the AND-gate 164, the other input of which is enabled by the second memory 152 by a 1 signal. The output of the AND-gate 164 thus will follow the output of the astable multivibrator 155 and provides pulses to the OR-gate 172 over line 192, so that the solenoid winding 26 of the inlet valve 21 will be repetitively energized and de-energized. Inlet valve 21 thus is periodically opened and closed and braking pressure $p$ rises slowly, as indicated in curve portion 783E.

The stepped rise in braking pressure terminates when the wheel is again decelerated, as braking pressure increases, and the fifth threshold switch 140 responds. Bleeder valve 22 is still closed, and inlet valve 21 is also closed over OR-gate 172. Braking pressure $p$ is again held constant, as seen in curve portion 783F.

The wheel is substantially delayed, due to the (assumed) slippery road surface and the threshold value $b_1$ of the first threshold switch 141 is passed in negative direction. Memory 151 is set over AND-gate 161 and provides a 1 signal at its output which again opens bleeder valve 22, by energizing solenoid 27 over AND-gate 165. This initiates a new cycle of rapid pressure decrease, as illustrated in curve portion 783G.

The example of braking illustrated in FIG. 7 shows that, again, and for a short time, the speed comparison circuit 147 will respond to provide a 1 signal at its output. As the threshold level $b_2$ is passed, the third memory 153 cannot be re-set however, and inlet valve 21 cannot be opened as soon as the threshold value $b_0$ is passed again. Rather, inlet valve 21 remains closed until bleeder valve 22 closes again, that is, until the first memory 151 is re-set, since the AND-gate 165 will continue to provide a 1 signal to the OR-gate 172. The first memory 151 is re-set by the third threshold switch 143, that is, when threshold limit $b_3$ is passed.

At this point, OR-gate 172 is not energized, neither by AND-gate 165, nor by the fifth threshold switch 140, nor by the speed comparison circuit 147, so that the inlet valve 21 could be opened; due to the slippery road conditions, however, pressure rise may not occur rapidly. Again, the astable multivibrator 155 is provided to prevent rapid pressure rise. AND-gate 163 does not provide a blocking signal to the astable multivibrator (MV) 155, since the third memory 153 has been set. Bleeder valve 22 remains closed and inlet valve 21 is pulsed by the astable MV 155, and braking pressure $p$ will rise slowly in accordance with curve 783H, in steps.

This slow pressure rise is sufficient, however, to decelerate the wheel again so that its circumferential speed will reach the vehicle speed as indicated by the narrowing of the gaps between curves 780 and 781. Wheel acceleration passes its peak value and then decreases again. When the threshold level $b_0$ is passed in a negative direction, the fifth threshold switch 140 again changes over to provide a 1 signal, to block inlet valve 21. Braking pressure $p$ remains constant since the bleeder valve is still closed, as indicated by curve portion 783I.

Wheel deceleration increases and will pass threshold value $b_1$, so that the first memory 151 can again be set over the AND-gate 161 and bleeder valve 22 can again be opened. This rapidly decreases brake pressure, this decrease of brake pressure continuing until the first memory 151 is again re-set - see curve portion 783J. Re-set of the memory 151 will occur when the wheel deceleration passes 0, so that the threshold level $b_2$ of the second threshold switch 142 is passed again. The speed comparison circuit 147 will not respond, however, under these conditions and provide a 0 signal so that the first memory 151 can be reset over AND-gate 162 and OR-gate 171. A slow, stepped pressure rise will follow by pulsed opening of inlet valve 21 - see curve portion 783K.

The third control cycle - in contrast to the first and second - provides for slow, pulsed pressure rise, but this continued pressure rise will not continue until a switching level $b_2$ of the second threshold switch 142 is reached; rather, the slow pressure rise is interrupted by a subsequent phase of fast pressure rise - see curve portion 783L - which continues from the time that the threshold level $b_3$ of the third threshold switch 142 is passed until the threshold level $b_4$ of the fourth threshold switch 144 is passed. Pressure will rise rapidly during this period, that is, while inlet valve 21 is open. None of the inputs of the OR-gate 172 will have a 1 signal applied to energize the solenoid 26 and thus interrupt supply of brake fluid. Astable multivibrator 155 is blocked during this time and merely provides a constant 0 signal at its output. The outputs of the fourth threshold switch 144 and of the third memory 153 must have a 0 signal, and the output of the third threshold switch 143 must have a 1 signal, since only then can AND-gate 163 provide a 1 signal.

The further cycles will continue as previously described, that is, a sequence of constant pressure will follow, a sequence of rapid pressure decrease, a sequence of slow pressure rise, etc.

The sequences of pressures in this embodiment are: slow pressure rise, fast pressure rise, slow pressure rise, constant pressure, rapid pressure decrease. This sequence is typical for the second embodiment in accordance with FIG. 4. Fast pressure rise is inhibited, however, if the speed comparison circuit 147 responds, as has been described in detail in connection with the first control cycle.

If the road is very slippery, it may occur that the wheel cannot accelerate actually as fast as indicated by curve 782, FIG. 7. Under such conditions, the braking pressure $p$ is decreased already during the first control cycle to such an extent that in subsequent cycles the pressure of the brake fluid will fluctuate only over a low average value.

Function of stages of the circuit of FIG. 4: The low-pass filters 132, 133 provide smooth, delayed signals for the various threshold circuits. As in the first example, the input signals of those threshold circuits which initiate rapid changes in pressure are delayed for a longer time than the input signals to threshold circuits which terminate rapid pressure changes.

AND-gate 161 prevents overtaking of the output signal of the first threshold circuit 141 by the output signal of the second threshold circuit 142 when the road conditions change rapidly.

The first memory 151 controls outlet valve 22, and second memory 152 prevents - over AND-gates 164, 165 - operation of the valves if the first memory 151 has not been set by the first threshold switch 141. Second memory 152 is re-set again when the braking operation has terminated by release of the brake pedal, that is, when a pulse is received from the brake light switch 195. The first memory 151 is re-set by the OR-gate 171 either from the output of the second threshold switch 142, or by the output from the third threshold switch 143. Under ordinary conditions, memory 151 is re-set in accordance with the first possibility, that is, by the output of the second threshold switch 142. If, however, the speed comparison circuit 147 has responded, AND-gate 162 is blocked and the second re-set condition will become operative. This ensures that the first memory 151 is re-set somewhat later when the roads are very slippery, so that pressure is reduced for a longer period of time.

The third memory 153 permits blocking of the astable MV 155 over all AND-gates 163 in the pressure intervals controlled by the two acceleration thresholds $b_3$ and $b_4$, as described above. This permits a 0 signal to appear at the output of the astable MV 155 and permit rapid rise of pressure in the braking system.

The third memory 153 is set by the AND-gate 166 if, for one condition, the speed comparison circuit 147 has responded and, further, the second acceleration threshold $b_3$ has been passed. The speed comparison circuit 147 thus has a second effect, that is, it inhibits rapid pressure rise if the difference in speed between vehicle and wheel is substantial.

The pressure inlet and bleeder valves are interlocked with respect to each other by a mutual interlock circuit which is somewhat different from that described in connection with the first example (FIGS. 3 and 6). The output of OR-gate 165 is applied to an input of the OR-gate 172, so that the circuit, effectively, is logically reversed with respect to that of the first example: the inlet valve is closed when the outlet valve is opened.

In the example in accordance with FIGS. 4 and 7, all three memories 151, 152, 153 are bistable flip-flops (FF). It is, of course, also possible to construct memory 151 as a monostable FF, with a predetermined re-set time, for example about 200 msec., so that the bleeder valve is closed reliably, and in any event, if for some reason or other or due to malfunction, a re-set valve for the memory 151 is not obtained. Since the second threshold switch 142 is controlled over a low-pass filter, a timed holding circuit for the second threshold switch 142 need not be supplied.

Figure 8:
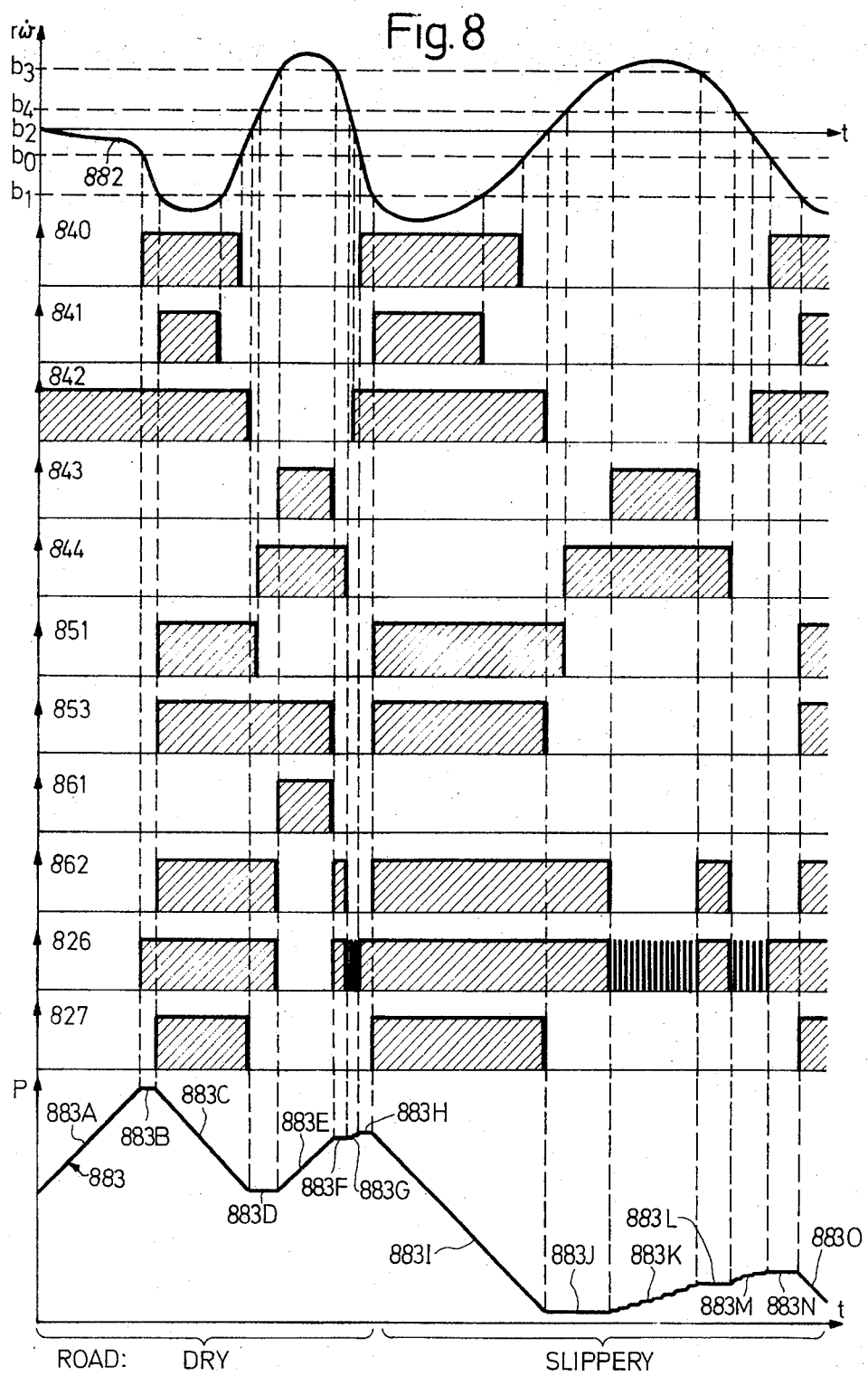
FIG. 8 is a series of graphs illustrating the operation of the third embodiment of FIG. 5.

Embodiment of FIG. 5, and with reference to FIG. 8: Similar elements are used in the embodiment of FIG. 5 as that in the first and second embodiments of FIGS. 3 and 4, respectively, and the similar elements have been given the same reference numerals as in FIG. 3, incremented by 200.

The differentiator 230 has the threshold circuit 242 connected to its output, and further a series circuit formed of a pair of low-pass filters 233, 234. The two low-pass filters 233, 234 have the same limiting frequency of about 18 Hz. Thus, the output signals of the low-pass filters have approximately the same limiting frequency. The time delay of the low-pass filters is somewhat different, however, and this is obtained by providing the filters with different transfer characteristics. The output signal of the first low-pass filter 233 drops at a rate of about 12 db per octave, with increasing frequency, whereas the drop of the low-pass filter 234 is about 24 db per octave. Thus, the time delay of the output signal of the second low-pass filter 234 is greater than that of the first low-pass filter 233.

The fourth and fifth threshold circuits 244 and 240 are connected to the first low-pass filter 233. The input of the first threshold switch 241 and of the third threshold switch 243 is connected to the output of the second low-pass filter 234. The first threshold switch 241 and the second threshold switch 242 each have a threshold adjustment input V, which is connected to the output of the speed comparison circuit 247.

The set input S of the first memory 251 is connected to the threshold switch 241; the re-set input R is connected to the fourth threshold switch 244. The output of the first memory 251 is connected to the set input of the second memory 252 and to the third memory 253. The first and the second memories are bistable flip-flops (FF), whereas the third memory 253 is a monostable FF having a pulse duration of approximately 80 msec. Two inputs of an OR-gate 271 are connected to the outputs of the fourth threshold circuit 244 and the output of the first memory 251. An AND-gate 261 has its input connected to the outputs of the third memory 253 and the third threshold switch 243. The outputs of the OR-gates 271 and of the third threshold switch 243 are connected to the inputs of an AND-gate 262, the output of which is connected to the blocking input E of an astable MV 255.

A NOR-gate 272 has three inputs, which are connected, respectively, to the output of an AND-gate 261 through OR-gate 272, the second memory 252 and the astable MV 255. Solenoid winding 27 of bleeder valve 22 has an AND-gate 265 connected to its control input. Three inputs control the AND-gate 265, connected, respectively, to the outputs of the second threshold switch 242, the first memory 251 and the NOR-gate 272. Similarly, solenoid winding 26 of input valve 21 has an OR-gate 273 connected thereto. The inputs to the OR-gate 273 are derived from the fifth threshold circuit 240, the NOR-gate 271 and the speed comparison circuit 247.

Operation, with reference to FIG. 8: Curve 882 is representative of wheel acceleration during two sequential control cycles. It is assumed that the vehicle, during the first control cycle, is on a dry road with good traction; during the second control cycle, the vehicle has moved to a slippery road surface. This is to indicate that this third embodiment is particularly effective to adapt itself to rapidly changing road surface conditions.

The pulse diagrams, again, illustrate the output signals of the various circuits referred to, in which the reference lines are incremented by 600 above the corresponding reference numerals of the structure in FIG. 5. Thus, graphs 840 to 844 illustrate the outputs of the threshold switches 240 to 244; graphs 851, 853 illustrate the outputs of memory 251 and 253, graphs 861, 862 the output signals of AND-gates 261, 262. The input circuits to solenoids 26 and 27 are illustrated in graphs 826, 827. Brake pressure $p$ is illustrated in graph 883. The cross-hatched areas indicate, as in the first example, those time periods during which the outputs are at a 1 signal.

The first control cycle is similar to that of the first example (FIG. 3). Curves 882 and 883 of FIG. 8 illustrate that during the first pressure rise the wheel has not yet tended to slip with respect to the road surface, so that the wheel deceleration is constant and less than the threshold value $b_0$ - see curve portion 883A. Eventually, however, the brake pressure $p$ will be too great and the threshold level $b_0$ will be exceeded. The 1 signal occurring at the output of the fifth threshold switch 240 then closes inlet valve 21 over the OR-gate 273, and the brake pressure $p$ will remain constant, see curve 883B - until response of the first threshold switch 241 indicates that even greater wheel deceleration is required.

The first memory 251 is set at this point and provides a 1 signal at its output which first opens the bleeder valve 22 over the AND-gate 265 and further sets the memories 252 and 253. After having been set, the second memory 252 provides a 0 signal and the third memory 253 a 1 signal. The output of the third threshold switch 243 still has a 0 signal, and thus the astable MV 255 is blocked, since AND-gate 262 is not conductive. All three inputs of the NOR-gate 272 have 0 signals, so that its output will have a 1 signal. This enables opening of the bleeder valve 22 since all three inputs of AND-gates 265 now will have a 1 signal applied.

Pressure decreases - see curve portion 883C - until the second threshold switch 242 responds and provides a 0 signal at its output which is connected over OR-gate 265 to close the bleeder valve 22 - see curve portion 883D. The inlet valve 21 remains closed, however, since the NOR-gate 272 furnishes a 1 signal. The 1 signal is only terminated when the wheel is positively accelerated to such an extent that the third threshold switch 243 responds and provides a 1 signal. The impulse time of the third memory 253 has not terminated yet, however, and thus the output of the AND-gate 261 has a 1 signal, which causes a 0 signal at the output of the NOR-gate 272, disabling AND-gate 265 and causing the bleeder valve 22 to be disconnected. Braking pressure rises rapidly - see curve portion 883E.

When the third threshold switch 243 returns to its base condition, the circuit condition changes, the NOR-gate 272 again provides a 1 signal and thus inlet valve 21 will be closed. A new phase of constant brake pressure $p$ is initiated - see curve portion 883F - which lasts only for a short period of time, however, namely until the threshold level $b_4$ has been passed.

The output signal of the fourth threshold switch 244 reverts back to 0. The first memory 251 was already reset when the fourth threshold switch changed to 1, and thus continues to provide a 0 signal. The OR-gate 271 therefore likewise will have a 0 signal, and the AND-gate 262 cannot provide any longer a 1 blocking signal for the multivibrator 255 and the astable MV 255 will oscillate to provide pulses for the inlet valve 21 so that the braking pressure $p$ gradually rises, in steps or pulses, as seen in curve portion 883G (FIG. 8).

This gradual rise of brake pressure lasts only for a short period of time. The wheel is again substantially delayed and the threshold level $b_0$ is passed. The fifth threshold switch 240 is directly connected to the OR-gate 273 and thus overrides the pulsing of the astable MV 255. The inlet valve 21 again closes, and bleeder valve 22 still is closed, since the first memory 251 is reset. As a result, the brake pressure $p$ will remain stable for a short period of time - see curve 883H.

The constant brake pressure period is terminated as soon as the first memory 251 is again set when the switching threshold $b_1$ is passed. As during the first control cycle, a period of rapid pressure drop, with opened bleeder valve 22 will follow - see curve 883I.

FIG. 8, as noted, has been drawn with the assumption that the road surface suddenly became slippery during the second control cycle. In spite of pressure drop, the retardation of the wheel will be carried out for a longer period and it is accelerated only slowly. This pressure drop duration, during the second control cycle, thus is much longer than that during the first control cycle. As in the first control cycle, it is terminated when the wheel acceleration passes 0, that is, when the second threshold switch 242 responds.

The subsequent constant pressure phase, curve portion 883J. is similar to that as during the first control cycle and is terminated when the third threshold switch 243 responds. A difference will arise, however, during the now succeeding pressure rise. NOR-gate 272 must provide a 0 signal for a rapid pressure rise, that is, at least one of its inputs must have a 1 signal. This 1 signal was provided, during the first control cycle, by AND-gate 261, since when the third threshold switch 243 responded, the pulse time of the third memory 253 (8 msec.) was not yet over.

During the second control cycle, the wheel acceleration occurred at such a slow rate that the third threshold switch 253 returns already when threshold level $b_2$ is passed. Thus, AND-gate 261 continues to provide a 0 signal even after the threshold level $b_3$ has been passed. Simultaneously, however, blocking of the astable MV 255 over AND-gate 262 is removed and the astable MV 255 provides pulses at its repetition rate to the inlet valve 21, so that braking pressure $p$ can rise slowly, in steps, until the third threshold switch 243 again changes state, or flips back. This simulates a good driver's action - namely "pumping" of the brake if a sudden slippery condition is encountered.

Further sequences of the control cycle are similar to those during the first control cycle and need not be described in detail again. Briefly, the pressure will be maintained constant (curve section 883L) until the acceleration threshold $b_4$ is passed, is then gradually raised in steps (curve portion 883M) until threshold level $b_0$ is passed, and then will be maintained constant (curve portion 883N) until threshold level $b_1$ is passed, in a negative direction. Thereafter, the pressure will drop again - see curve section 883 0.

The normal control cycle, in the third embodiment, is slightly different from that in the first two embodiments, and has this sequence: constant pressure, pressure drop, constant pressure, rapid pressure rise, constant pressure, slow pressure rise, constant pressure, pressure drop . . . . It may occur that the third threshold switch 243 changes from 0 to 1 when the third memory 253 has already returned (memory 253 being a monostable FF); in this case, the rapid pressure rise is replaced by a slow or gradual pressure rise.

In the third embodiment it was not necessary that the speed comparison circuit 247 was required to provide a signal to the circuit, in spite of the change from dry to slippery road conditions, that is, that the wheel speed with respect to vehicle speed has decreased to an excessive extent. This advantage, with respect to the first two embodiments is controlled by the third memory 253. This third memory 253, in effect, measures the time which is necessary for reacceleration of the vehicle wheel. In the third embodiment, the pulse duration of the third memory 253 provides a threshold or limiting level for the second derivative of angular wheel speed, with respect to time ($r\dot\omega$). If the reacceleration is faster than this threshold level, determined by the timing of the third memory 253, which is a monostable FF, then a more rapid pressure rise is permitted; otherwise, not.

The speed comparison circuit may, therefore, be connected in the third embodiment to different circuit components than in the first two. For reliabilty, a connection can be carried from the speed comparison circuit 247 to the OR-gate 273 to inhibit any pressure rise as soon as the speed comparison circuit 247 responds. Additionally, however, the first and the second threshold switches 241, 242 have a further threshold adjustment input V, which is connected to the speed comparison circuit 247. Preferably, the threshold levels of the threshold switches, for the third embodiment, are selected as follows:

first threshold switch 241, threshold level $b_1 = -3.5$ g second threshold switch 242, threshold level $b_2 = 0$ g third threshold switch 243, threshold level $b_3 = +4$ g fourth threshold switch 244, threshold level $b_4 = +1$ g fifth threshold switch 240, threshold level $b_0 = -2$ g.

Upon a signal from the speed comparison circuit 247, the threshold levels will be as follows:

first threshold switch 241, threshold level $b_1 = -1.5$ g second threshold switch 242, threshold level $b_2 = +5$ g.

Bleeder valve 22 can be closed only at quite high values of accelerations, whereas it can be opened already at small levels of deceleration. The speed comparison circuit 247 is then necessary only in especially severe cases, since the time limit for re-acceleration (determined by the unstable time of the monostable FF of the third memory 253) reliably responds to changes in road surface conditions. The criteria for change in grip, that is, friction between road and wheel, are the second derivative of the angular speed of the wheel. It has already been attempted to determine this second derivative, with respect to time, by use of a further differentiating network. This requires a substantial circuit with the consequent danger of malfunction, since a differentiator passes short spurious pulses without damping. The circuit, as described, utilizing a third memory 253 with a predetermined time constant distinguishes between two different value of the second derivative of angular wheel speed. It is not so sensitive to noise or spurious pulses as a circuit including a further differentiating network.

The circuit itself is simple and reliable, and highly immune to noise and spurious signals. Change in road surface condition can be readily determined, which is not possible in connection with the examples of the circuits of FIGS. 3 and 4.

Figure 9:
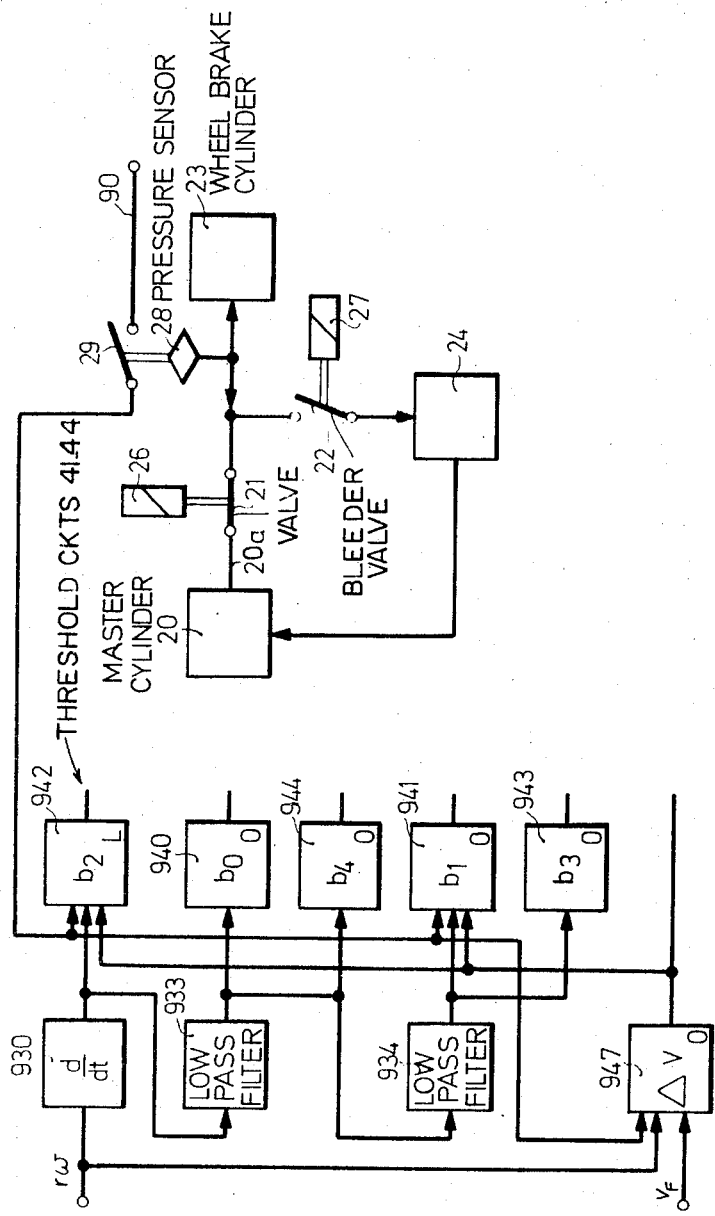
FIG. 9 is a fragmentary diagram illustrating a modification of the third embodiment of FIG. 5.

A comparison of the graphs of FIGS. 7 and 8 shows that, if the road surface is slippery, the control cycles will proceed at substantially lower braking pressures than when the road provides good traction. FIG. 9 illustrates a modification of the third embodiment (FIG. 5) in which the switching threshold of the first and second threshold switch can be changed in dependence on braking pressure, that is, the braking pressure is utilized as a characteristic representative of road condition.

The right side of FIG. 9 includes, schematically, the hydraulic circuit of the wheel braking system, similar to FIG. 1; on the left side, so much of the network of FIG. 5 is reproduced as is necessary for a discussion of the modification, showing a differentiator 930, low-pass filters 933, 934, threshold switches 940 to 944 and speed comparison circuit 947. A brake pressure sensing device, such as a pressure diaphragm chamber is connected to a fluid pressure line supplying wheel brake cylinder 23. The pressure sensor 28 operates a pressure switch 29 which is connected between a positive bus 90 and additional inputs to the first and second threshold switches 941, 942, as well as to the speed comparison circuit 947.

Pressure switch 29 is set to respond upon a braking pressure of approximately 30 at gauge. When the brake pressure p drops below this value, pressure switch 29 causes a shift of the switching threshold levels $b_1$ and $b_2$ in the same direction, as would be caused by the speed comparison circuit 947. The effect of the speed comparison circuit 947 can be selected to be less than that in the example of FIG. 5 so that, for example, the switching threshold level $b_2$ can be changed upon response of the speed comparison circuit to only +2.5 g whereas, when the pressure sensor 28 responds, it is additionally changed to +5 g.

Figure 10:
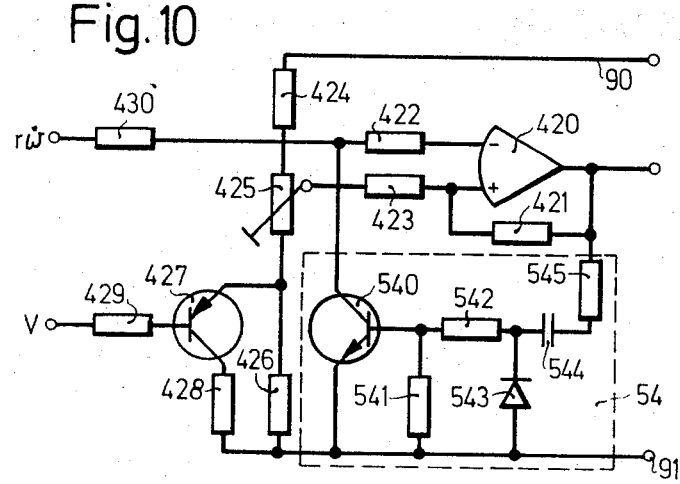
FIG. 10 is a schematic diagram of a threshold switch with a timed holding circuit.

Circuit details: The construction of differentiators, low-pass filters, threshold circuits, flip-flops and multivibrators, AND-gates and OR-gates and the like are well known and need not be discussed in detail. FIG. 10 illustrates in schematic diagram the circuit of the second threshold switch 242 with the holding circuit 254 as used, for example, in FIG. 5. An operational amplifier 420 has a feedback resistor 421 connected from its output to the positive input. Voltage divider 424, 425, 426, connected between positive bus 90 and ground, or chassis bus 91, provides a voltage from its tap point to the non-inverting input over a resistor 423, to set or determine the switching level $b_2$.

The inverting input of operational amplifier 420 is connected over a series circuit (resistors 422, 430) to the output of the differentiator 230, having a signal $r\omega$) applied thereto; this is the input to the threshold circuit. A portion of the voltage divider, namely resistor 426 can be bridged by the emitter-collector path of a transistor 427 (and resistor 428) if transistor 427 is conductive. The base of transistor 427 is connected to a resistor 429, the other terminal of which forms the threshold control input V of the second threshold switch 242. Additional transistors similar to transistor 427, with different collector-emitter resistances, or different resistors corresponding to resistor 428 in series may be used if various threshold levels are to be commanded.

The holding circuit 254 includes a transistor 540, the collector of which is connected to the junction between the resistors 422, and 430, and the emitter of which is connected to chassis 91. The base of transistor 540 is connected over resistor 541 to chassis 91, and further over a series circuit including resistor 542 and capacitor 544 and additional resistor 545 to the output of operational amplifier 420. A diode 543 connects from the junction between resistor 542 and capacitor 544 to chassis 91. Setting the resistance of resistor 425 by means of an adjustable slider sets the threshold level $b_2$.

Operation: If the input voltage of the inverting input of operational amplifier 420 is above the threshold level determined by the setting of the tap point of the voltage divider 424, 425, 426, then the output of operational amplifier 420 will have the potential of the chassis bus 91 thereon, that is, will be at 0 signal level. Conversely, the output of operational amplifier 420 will have the voltage of positive bus 90 thereat when the input voltage of the inverting input is below the threshold level set by the tap point on resistor 425, that is, will then provide a 1 signal. If speed comparison circuit 247 provides a threshold change signal to input V corresponding to a 0 level, then transistor 427 will be conductive and the threshold level $b_2$ is changed towards lesser, that is negative values. A change in the output voltage of operational amplifier 420 is fed back over resistor 545 and capacitor 544 to the junction between the resistor 542 and diode 543. A negative change is short-circuited by the diode 543 to ground 91; a positive change is transferred over resistor 542 to the base of transistor 540 which will become conductive. In effect, the inverting input is short-circuited to ground as soon as the input voltage on resistor 430 has dropped below the level set by the resistance tap on resistor 425.

The short circuit of the inverting input only persists until capacitor 544 has been charged oppositely over the voltage divider formed of resistors 541, 542, 545. The base voltage of transistor 540 then again drops to ground potential and transistor 540 blocks. Preferably, capacitor 544 is so selected that transistor 540 will remain conductive only about 20 msec.

Figure 11:
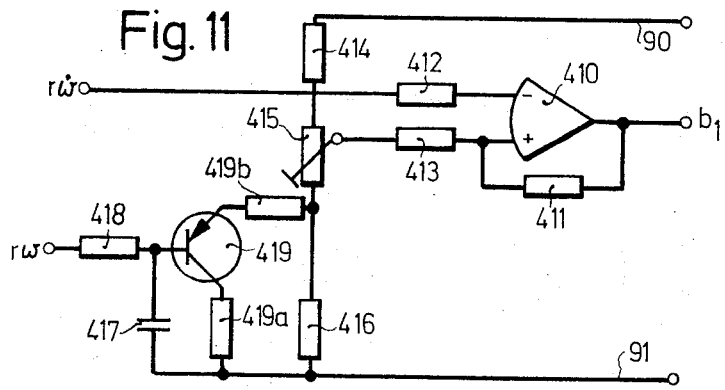
FIG. 11 is a schematic circuit diagram of a threshold switch with adjustable threshold values.

FIG. 11 illustrates a fragmentary circuit for the first threshold switch 41, which is a modification of the circuit of FIG. 10, and similar components have been given similar reference numerals, decremented by 10, with respect to FIG. 10.

Two resistors 419a, 419b are connected, over a transistor 419, in parallel to resistor 416, if the base of transistor 419 is held to a small positive d-c voltage. Transistor 419 then will not act as a switch, but rather as an amplifier. The base of transistor 419 is connected over capacitor 417 with ground 91 and over a resistor 418 with the first input terminal 93.

The base of transistor 427 thus will have a voltage applied thereto, the value of which is proportional to the circumferential speed of the wheel. The threshold level of the first threshold switch 41 then changes in dependence on wheel circumferential speed in accordance with the graph of FIG. 12. When the wheel speed is low, for example up to vehicle speeds corresponding to about 20 km/h, the threshold value $b_1$ will be at about −2 g. In the region up to about 40 km/h, there is a linear rise until, above 40 km/h, the threshold level remains constant at about −3.5 g. Capacitor 417 and resistor 418 function as a delay circuit in order to prevent abrupt changes in the threshold level.

Constructing the first threshold switch 41 as discussed in connection with FIG. 11 is based on the observation that, particularly driven wheels, tend to lock rapidly, that is, with little delay to complete blocked, stopped condition at slow pressure rises, or constant pressure which is only slightly above locking pressure. The threshold level $b_1$, which initiates pressure drop, may not be reached. This difficulty is particularly common with driven wheels, since their inertia is greater, due to the interconnection of the driven wheels with the drive train of the vehicle and the motor, that is, differential, transmission, etc. as well as main crankshaft. This difficulty is corrected, particularly at higher vehicle speeds, by the speed comparison circuit, which is, however, preferably so set that it will respond only at a speed difference of from 15 to 20 km/h between vehicle and the wheel under consideration. Thus, at vehicle speeds below this difference limit, that is, for example below 15–20 km/h, this difficulty can no longer be corrected. On glare ice, however, it is dangerous to have locked wheels even at such low speeds, since steering of the vehicle is then lost.

There are additional reasons for preferring the circuit according to FIG. 11: The friction between the wheel and road is greater at low speeds; further, the delay time of a pulse-type speed transducer (as customarily used) increases with decreasing speed. The higher delay time of the tachometer generator providing the wheel speed signal, as well as the greater friction between wheel and road can be compensated by shift of the switching threshold $b_1$ in positive direction, that is, to a lesser delay, or lesser amount.

The speed comparison circuit 47 is illustrated in detail in FIG. 13, which also shows a circuit to simulate vehicle speed. The speed comparison circuit 47 is constructed in the form of a threshold switch and thus contains similar components as the threshold switch of FIG. 10, and such similar components have been given the same reference numerals, incremented by 50 with respect to those of FIG. 10; specific description has been omitted.

The circuit to simulate the vehicle speed $V_F$ has, as its main component, a storage capacitor 452 which is charged over four diodes 453, 454, 455, 456. Storage capacitor 452 is discharged over a constant current source, formed as a transistor 450 with emitter resistor 451 and a base voltage divider 457, 458. The tap point of the voltage divider 457, 458 further is connected to a capacitor 459 and then to ground bus 91, and over a series connection of two resistors 460, 461 to positive 90. The junction between resistors 460 and 461 is connected over a pair of resistors 462, 463 to two pressure switches 29, 29a which, further, are connected to ground bus 91. An inverter stage including an operational amplifier 468 is connected to the capacitor 452. Feedback for the operational amplifier is connected over resistor 469 so that an amplification factor of ONE can be set. The non-inverting input is connected over input resistor 467 to the tap point of voltage divider formed of resistors 464, 465, that is, to a fixed voltage. The inverting input is connected over input resistor 466 to the input of the circuit, that is, to capacitor 452. The input terminal 93 and the output of the operational amplifier 468 - which, additionally, forms the second input 94 for the speed comparison circuit 47, are connected over an adding resistor 477, 478, respectively, to the input resistor 472 of the speed comparison circuit 47.

Operation: The four diodes 453–456 are each connected to an input terminal 93 associated with the wheel braking system of each wheel of the vehicle. Thus, the circuit to provide an analog representative of vehicle speed is provided only once on the vehicle.

Capacitor 452 is charged to a positive voltage which is proportional to the highest appearing wheel speed. It can be assumed that it is unlikely that all four wheels will lock simultaneously. Thus, the highest wheel speed is at least roughly equal to that of the vehicle, or, at least can be selected to be representative of vehicle speed $V_F$. If all four wheels lock simultaneously, storage capacitor 452 would retain its previous voltage if constant current source 450, 451 were not provided. Thus, in critical driving situations, the vehicle speed might be incorrectly simulated.

The base voltage divider 457, 458 is so adjusted that the charging condenser 452 is discharged at a current level which corresponds roughly to a vehicle deceleration, that is, rate of change of speed of −1 g. In case all four wheels have locked, the previous vehicle speed thus decreases with a delay of −1 g, which corresponds roughly to the maximum vehicle deceleration which can be achieved. On very slippery roads, this vehicle deceleration will of course not correspond to actual vehicle deceleration and will be less, and erroneous vehicle speed might be simulated, if it were not for switches 29, 29a. These switches are pressure switches, preferably connected to the two forward wheels of the vehicle, and set to close when the brake pressure falls below a value of about 30 at gauge, as already above described. A braking pressure of such a low value is indicative, as above noted, of a slippery road surface. Resistors 462, 463 preferably are so dimensioned that the discharge current of the constant current source 450, 451 decreases to a value corresponding to a vehicle deceleration of −0.8 g when one switch is closed and, when both switches are closed, the discharge current is changed so that the deceleration of only 0.5 g is simulated.

The two pressure switches have the effect that the vehicle as a whole can be decelerated if only one side of the vehicle is on a slick surface, for example on an iced stretch of pavement, whereas the other side of the vehicle still has traction, for example is on the shoulder off the pavement, or if, for example, one side of the vehicle is passing through a puddle.

The speed comparison circuit 47 responds to a difference in speed between a specific wheel and the vehicle. Thus, circumferential wheel speed (input terminal 93) is connected directly to the threshold switch 470, and the simulated vehicle speed is connected over the inverter stage 468. The two adding resistors 477, 478 then form the speed difference. A plurality of such difference circuits 47 will be provided, each one connected to the output terminal of inverting operational amplifier 468 and the respective input terminal 93.

The difference in structure and operational effect between the various embodiments can be compared: The first embodiment, in accordance with FIG. 3, provides a good three-condition control of the brake pressure, matched to wheel delay, with little circuit requirements, and with a high degree of liability, including inherent fail-safe features. The speed comparison circuit 47 directly controls the inlet valve 21 and inhibits any rise in braking pressure if a certain difference in speed is exceeded. It changes the re-set of the first memory 51, so that memory 51 will not respond to the second threshold switch 42 but rather will respond to the third threshold switch 43, thereby delaying reacceleration of the wheel.

The second embodiment, in accordance with FIG. 4, additionally introduces the fifth threshold switch 140 and the astable MV 155. Both circuit elements decrease the swing of the brake pressure or, rather, the control swing controlling the brake pressure, since an additional acceleration threshold is provided for a finer sub-division of measurement of acceleration, and further, due to the different rates at which pressure will rise, the pressure change will be more gradual, as is clearly apparent in FIG. 7, particularly the last control cycle as indicated in curve 783. Somewhat more and complex circuitry than that required for FIG. 6 is necessary, however.

The first two embodiments have the common characteristics that sudden changes in road condition, resulting in sudden changes in coefficients of friction between wheel and road are not sensed. Pressure drop thus will result only when the wheel is substantially slower than the vehicle, that is, when the speed comparison circuit responds. This may introduce a fairly substantial delay.

The embodiment in accordance with FIG. 5 has the advantage that the third storage or memory device 253 measures the time which is necessary for re-acceleration of the wheel. Thus, only one single control cycle is necessary to provide information to the circuit whether the road is slippery or dry. Additionally, the component requirement for the third embodiment of FIG. 5 is modest. The speed comparison circuit 247, in the third example, is only provided as a safety measure or device. Its effectiveness thus is restricted to controlling the closing of inlet valve 21, but additionally it is used to change the threshold level of the first and second threshold switches. As in the first example, the first memory or storage device 251 may be in the form of a monostable MV, so that, even if a reacceleration signal is missing (derived from the fourth threshold switch 244), the bleeder valve 22 will be reliably closed after a predetermined time, for example 200 msec. This is a safety feature.

The low-pass filters, and their limiting frequencies described in the three examples are only exemplary, since the exact selection of the limiting frequency, and the number of the filters will depend on the mechanical structure and driving characteristics of the vehicle with which the circuit is to be used. The limiting frequency of the low-pass filter and the repetition rate of the astable MV must be so selected that inherent oscillations of the vehicle, that is, possible self-oscillation of the vehicle or the chassis, due to its critical characteristics, can be reliably avoided.

The pressure switch of FIG. 9 and FIG. 13 can be utilized with any one of the examples, thus further improving operating reliability and safety, since further data for road conditions are provided to the circuit. It is also possible in all of the examples to change the threshold level of the threshold switch 41 in dependence on circumferential wheel speed, as discussed in connection with FIG. 11.

All three embodiments, in common, avoid the bucking of the vehicle upon application of the brake. Utilizing at least four, and in some embodiments five acceleration sensitive threshold switches substantially decreases the control amplitude of the pressure in the brake line over that previously known, and increases the response sensitivity, since each threshold switch itself can be set for lower values of delay or retardation, and thus for lower deceleration values.

Various changes and modifications may be made within the scope of the invention concept.

We claim:

1. Vehicle wheel braking control system comprising means (20, 25b, 25a, 20a) supplying a brake fluid medium under pressure;

controllable brake pressure valve means (21) having a control winding (26) and applying pressurized brake fluid to a wheel brake cylinder (23);

controllable bleeder valve means (22) having a control winding (27) bleeding brake fluid from the wheel brake cylinder (23);

means (93) providing a signal ($r\omega$) representative of wheel speed;

differentiator means (30, 230) providing a differentiated signal ($r\dot\omega$) representative of change of wheel speed;

a group of at least three threshold circuits (41-44) connected to the differentiator means (30), the first threshold circuit (41) responding to wheel deceleration above a predetermined first threshold level ($b_1$) corresponding to maximum wheel deceleration and being connected to open the bleeder valve means (22) and to close the pressure valve means (21) to effect a steep drop in brake fluid pressure applied to the wheel;

the second threshold circuit (42) responding to about 0 change in wheel speed ($b_2$) upon transition of wheel speed change from deceleration to acceleration and being connected to close the bleeder valve means (22) to effect termination of the steep drop in brake fluid pressure;

the third threshold circuit (43) responding to a first value of wheel acceleration ($b_3$) corresponding to wheel reacceleration and being connected to open the pressure valve means (21) to effect increase in brake fluid pressure applied to the wheel;

controlled connecting means (65) interlocked with a control connection (92) and interlocking the pressure brake valve winding (26) and the bleeder valve winding (27) to permit bleeding of brake fluid only if the brake pressure valve means (21) interrupts supply of pressurized brake fluid to the wheel brake cylinder (23);

and a low-pass filter (31; 233, 234) connected between the output of the differentiator means (30, 230) and the input of the first (41, 241) and the third (43, 243) threshold circuit, and filtering stray and noise signals from being applied to said first and third threshold circuits effecting steep drop in brake fluid pressure, or increase in brake fluid pressure, respectively.

2. System according to claim 1, wherein the controlled connection means comprises an AND-gate (65) controlling energization of the bleeder valve winding (27) to permit brake fluid flow through the bleeder valve means (22) only if pressurized fluid flow to the brake cylinder (23) has been interrupted.

3. System according to claim 1, further comprising a memory circuit (51) connected to respond to the first threshold circuit (41) and storing information representative of wheel deceleration, the first memory circuit being connected to one of the other threshold circuits of the group and terminating storage of wheel decelerating information upon response of one of said other threshold circuits.

4. System according to claim 3, comprising conjunctive gate means (64, 164, 272) connected to control energization of the brake valve winding (26);

a second memory (52), the output of the second memory being connected to the conjunctive gate;

means controlling setting of the second memory when said threshold level of the first threshold switch (41) is exceeded, and means (95, 195, 295) re-setting the second memory (52) upon release of pressure from the pressurized brake fluid.

5. System according to claim 4, wherein the second memory is a bistable flip-flop.

6. System according to claim 3, further comprising an AND-gate (61) having its output connected to the memory circuit (51), the input of said AND-gate (61) being connected to and derived from the first and second threshold switches (41, 42);

a speed comparison circuit (47) is provided having an output signal representative of difference in circumferential wheel speed and vehicle speed;

a second AND-gate (62) being provided, and AND-gate being connected to the output of the second threshold switch (42) and the speed comparator circuit (47), the output of said second AND-gates, and the output of the third threshold switch (43) controlling re-setting and termination of storage of the memory circuit (51).

7. System according to claim 6, further comprising a fourth threshold switch (44) connected to and controlled by the differentiator means (30, 230) and responding to drop of wheel acceleration below a second value of wheel acceleration, and corresponding to decrease in the rate of change of wheel acceleration, and being connected to operate the pressure valve means (21) to close said pressure valve means and inhibit rapid rise of application of brake fluid pressure applied to the wheel;

a third memory (53);

a third AND-gate (63), the third and fourth threshold switches (43, 44) being connected to the input of the third AND-gate, the output of said third AND-gate (63) being connected to set the third memory (53);

the fourth threshold switch (44) and the output ot the memory circuit (51) being connected to control selectively (OR-gate 71) re-setting of the third memory;

a second memory being provided (52) controlled by the first threshold switch (41) and re-setting upon termination of brake pedal pressure (95);

the output of the speed comparison circuit and the third memory being connected disjunctively (OR-gate 73) to conjunctively (AND-gate 64) control, with the output of the second memory, energization of the brake valve winding (26).

8. System according to claim 7, wherein the third memory comprises a monstable flip-flop.

9. System according to claim 7, wherein the first and the third memories are monostable flip-flops having an unstable pulse period of about 200 msec.

10. System according to claim 3, wherein the first memory comprises a monostable flip-flop (51).

11. System according to claim 10, wherein the monostable flip-flop (51) has an unstable time longer than the re-set period normally expected under vehicle operating conditions, the monostable flip-flop re-Setting automatically even in the absence of a re-set signal to prevent malfunction of the system and to provide for fail-safe operation.

12. System according to claim 3, comprising a fourth threshold switch (44) connected to and controlled by the differentiator means (30, 230) and responding to drop of wheel acceleration below a second value of wheel acceleration, and corresponding to decrease in the rate of change of wheel acceleration, and being connected to operate the pressure valve means (21) to close said pressure valve means and inhibit rapid rise of application of brake fluid pressure applied to the wheel;

wherein the first threshold switch (241) is connected to the set input (S) of the memory circuit (251) and the fourth threshold switch (244) is connected to the re-set input (R) of the first memory means.

13. System according to claim 12, further comprising a second memory (252) and a third memory (253);

the output of the first memory (251) controlling the set input of the second and third memories (252, 253);

and a disjunctive circuit connected to the output of the fourth threshold circuit (244) and the output of the first memory circuit (251), the disjunctive circuit (271) controlling the brake valve winding (26) to control application of pressurized brake fluid to the wheel brake cylinder.

14. System according to claim 13, wherein the first memory circuit (51) and the second memory (252) are bistable flip-flops;

and the third memory (253) is a monostable flip-flop having a pulse duration in the order of about 80 msec.

15. System according to claim 13, comprising a conjunctive circuit (261) having its inputs controlled by the outputs of the third memory (253) and the third threshold switch (243), the output of the conjunctive circuit forming a control input for the brake valve winding (26) controlling application of pressurized brake fluid to the wheel cylinder.

16. System according to claim 13, further comprising an astable multivibrator (255) having a blocking input terminal (E);

and means (262; 271) logically interconnecting the blocking input (E) of the astable multivibrator with the third threshold circuit (243), the fourth threshold circuit (244) and the memory circuit (251), the output of the astable multivibrator controlling pulsed opening and closing of the brake valve (21) to permit gradual rise, only, of pressure due to gradual admission of pressurized brake fluid to the wheel brake cylinder.

17. System according to claim 16, including a NOR-gate (272) having its output connected to the brake valve winding (26), the NOR-gate (272) having its input connected to the output of the astable multivibrator (255), and the second and third memories (252, 253).

18. System according to claim 17, further comprising an OR-gate (273) connected in advance of the brake valve winding (26) for selective application of signals thereto; and a speed comparison circuit (247) providing an output signal representative of difference between wheel speed and vehicle speed in excess of a predetermined value;

the output from said speed comparison circuit (247), the NOR-gate (272 and the fifth threshold circuit (240) being connected to the input of the OR-gate (273).

19. System according to claim 17, wherein the controlled connection means comprises a three-input AND-gate (265), one input being derived from the memory circuit (251), a second input being derived from the output of the NOR-gate (272) and a third input being derived from the second threshold switch (242).

20. System according to claim 3, further comprising a second memory circuit (52) having its set input connected to the output of the first memory circuit (51), and having a reset input (R);

the wheel braking control system further comprising brake pedal means (20'), and electrical connection means (95) operative upon release of the brake pedal means connected to the re-set terminal of the second memory circuit (52) and operative to re-set the second memory circuit upon release of the brake pedal means.

21. System according to claim 3, further comprising a second memory circuit (52) having its set input terminal (S) connected to be controlled by the first threshold switch (41), the second memory circuit having a re-set terminal (R);

the wheel braking control system further comprising brake pedal means (20') and electrical connection means (95) operative upon release of the brake pedal means connected to the re-set terminal (R) of the second memory (52) to re-set the second memory circuit upon release of the brake pedal means.

22. System according to claim 21, wherein the vehicle is provided with a brake light switch, and the electrical connection means are interconnected with the brake light switch.

23. System according to claim 1, further comprising a fifth threshold switch (140) connected to the output of the differentiator (130) and responding to a small negative value of wheel rate of change of speed.

24. System according to claim 1 comprising a NOR-gate (272) forming a conjunctive gate and controlling energization of the brake pressure valve winding (26) of the brake pressure valve (21), one output from the NOR-gate (272) forming a control input to the controlled connection means (265; FIG. 5).

25. System according to claim 24, comprising an additional low-pass filter (233), connected between the output of the differentiator means (230) and the low-pass filter (234);

a fourth threshold switch (244), a fifth threshold switch (240), the fourth (244) and fifth (240) threshold switches being connected to the output of the first series connected low-pass filter (233).

26. System according to claim 25, wherein both low-pass filters (233, 234) have the same limiting frequency.

27. System according to claim 26, wherein the limiting frequency is about 18 Hz.

28. System according to claim 26, wherein the transfer characteristics with respect to time of the low-pass filter (234) and the additional low-pass filter (233) are different, to provide for different time delay periods of signals passing through the low-pass filter and the additional filter.

29. System according to claim 28, wherein the time delay of the low-pass filter (234) is greater than that of the additional low-pass filter (233).

30. System according to claim 1, wherein at least one of the threshold switches has a variable threshold level characteristic;
the threshold switch being provided with a control input (V) connected to a speed comparator circuit (47), having, at one input (94) a signal representative of vehicle speed applied thereto and having, at a second input (93) a signal representative of wheel speed applied thereto, the output from said speed comparator circuit controlling energization of the brake valve winding (26) and hence flow of pressurized brake fluid to the wheel cylinder (23) in a direction to inhibit application of pressurized brake fluid to the wheel cylinder when the comparator circuit indicates an excessive speed difference between circumferential wheel speed and vehicle speed, to change the threshold response level of the respective threshold switch upon application of a signal to the threshold switch from the speed comparator circuit.

31. System according to claim 30, wherein the first and second threshold switches are provided with auxiliary control inputs connected to the speed comparator circuit (47), the threshold levels ($b_1$, $b_2$) of the first and second threshold switches (41, 42) changing, in positive direction, upon application of a signal to the control input.

32. System according to claim 1, comprising a pressure switch (28, 29) responsive to brake fluid pressure in the wheel brake cylinder (23), and providing a pressure signal when the pressure reaches a predetermined level;
at least one of the threshold switches (41, 42) having an additional input changing the threshold level of the threshold switches;
the pressure switch being connected to the level-change input of the threshold switch, or switches to change the threshold level in a positive direction when the pressure level in the brake cylinder drops below said predetermined level.

33. System according to claim 32, wherein the pressure level is about 30 at - gauge.

34. System according to claim 1, wherein at least one of the threshold switches (40-45) comprises an operational amplifier (420) with a positive feedback circuit (FIG. 10), the differentiator means (30) providing the differentiated wheel speed signal ($r\dot\omega$) representative of rate of change of wheel speed, and connected to the inverting input of the operational amplifier (420);
and means (424, 425, 426) providing a reference voltage to the non-inverting input of the operational amplifier.

35. System according to claim 34, wherein the means providing a reference voltage comprises a voltage divider (424, 425, 426), and controllable resistance means (427, 428) connected to the voltage divider to change the voltage division ratio thereof, so that the threshold level of the threshold switch is changed by applying a different reference voltage to the non-inverting input of the operational amplifier (420) upon control of the resistance value of the controllable resistance path connected to the voltage divider.

36. System according to claim 35, wherein the controllable resistance path comprises a transistor (427) having its emitter-collector path connected in parallel with a portion (426) of the voltage divider, the base of the transistor (427) forming a control input (429) for a control voltage.

37. System according to claim 36, including a delay circuit (FIG. 11: 417, 418) connected between the means providing the signal representative of wheel speed and the base of the transistor (419).

Figure 12:
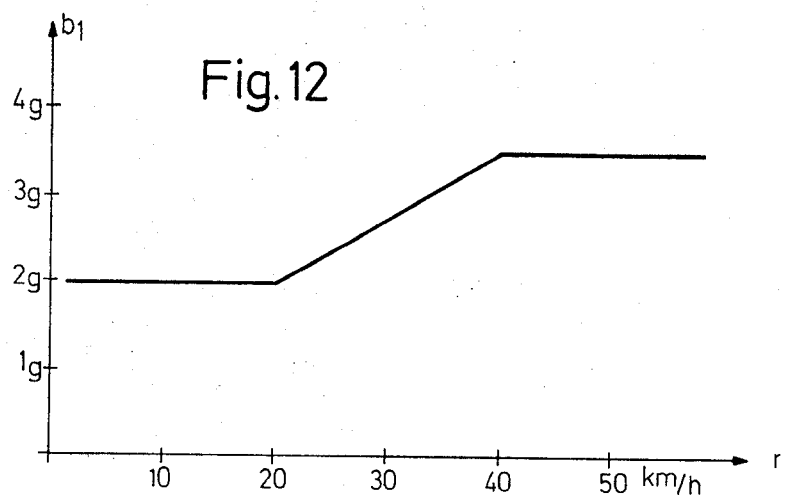
FIG. 12 is a diagram illustrating the operation of the circuit of FIG. 11.

38. System according to claim 36, wherein the voltage division ratio of the voltage divider (FIG. 10: 424, 425, 426; FIG. 11: 414, 415, 416) and the resistance of the emitter-collector path (419b, 419, 419a) and the signal representative of wheel speed are adjusted to provide a threshold value ($b_1$) of the threshold switch corresponding to about $-3.5$ g when the wheel has a speed corresponding to rotating speed of about 40 km/h; the threshold level is about $-2$ g when the wheel has a speed corresponding to rotating speed of 20 km/h or less; and the threshold level changes approximately linearly proportionately from $-2$ g to $-3.5$ g for speed variations between 20 km/h to 40 km/h (FIG. 12).

39. System according to claim 36, wherein the means (93) providing the signal ($r\omega$) representative of wheel speed is applied to the base of the transistor.

40. System according to claim 3, wherein the second threshold switch (42) includes a timed holding circuit (54) having a time delay which is short with respect to the holding time of the memory circuit (51), the holding circuit removing the signal from the second threshold circuit (42) after the threshold level ($b_2$) has been passed in a negative direction during the delay time of the holding circuit.

41. System according to claim 40, wherein the holding circuit has a delay time of about 20 msec., and connects the input of the second threshold circuit to ground.

42. System according to claim 1, further comprising a circuit simulating vehicle speed ($V_F$) comprising
a storage capacitor (FIG. 13: 452);
a constant current circuit (450, 451, 457, 458) connected to discharge the storage condenser (452);
and parallel-connected diodes (453, 454, 455, 456), one each connected to the means providing a signal ($r\omega$) representative of the speed of one of the respective wheels of the vehicle to charge the storage capacitor to the maximum voltage derived from any of said wheel speed signal generating means (93) associated with any of the wheels, and to provide for uniform discharge of the capacitor at a constant rate.

43. System according to claim 42, including pressure switches (29, 29a) connected to the brake cylinders (23) of the brakes associated with non-driven wheels; and means interconnecting the pressure switches to modify the discharge current of the constant current circuit to decrease the discharge current when low brake pressure is sensed.

44. System according to claim 43, wherein the constant current circuit includes a transistor having a controlled base voltage applied thereto;
the pressure switches (29, 29a) being connected in the base circuit of the transistor to modify the base voltage applied to the transistor;
and a delay circuit between the pressure switches and the base circuit of the transistor to delay change in the discharge rate of the storage capacitor upon closing of one of said pressure switches.

45. System according to claim 43, wherein at least two pressure switches are provided, one each being associated with a non-driven wheel of the vehicle, each pressure switch separately influencing the discharge rate of said capacitor so that, if only one pressure switch responds, the discharge rate will be changed by a first value, and when both pressure switches respond, the discharge rate will be changed by a second value.

46. System according to claim 1, further comprising timing means (253) energizable to measure a predetermined time interval and then provide an output signal; said timing means (253) being connected to be energized upon sensing of a first level ($b_1$) of wheel deceleration upon response of the corresponding threshold switch (41);

a common response circuit (261) connected to the output of one of the other threshold switches having a threshold level different from said first threshold level, and the output of said timing means, thus determining the time interval during which a predetermined rate of change of wheel speed occurred, the common response circuit providing an output signal representative of the second derivative of wheel speed ($r\omega$).

47. System according to claim 1, further comprising threshold circuit means (44) connected to and controlled by the differentiator means (30, 230) and responding to drop of wheel acceleration below a second value corresponding to decrease in the rate of wheel acceleration and being connected to operate the pressure valve means (21) to close said pressure valve means and inhibit rapid rise in brake fluid pressure being applied to the wheel.

48. System according to claim 47, wherein the threshold circuit means comprises a fourth threshold switch, said value of acceleration being between the threshold level of said second and said third threshold switch.

49. System according to claim 48, comprising a first low-pass filter (132) having a limiting frequency of about 40 Hz and connected between the output of the differentiator (130), and the inputs of the second and fourth threshold switches (142, 144, 140).

50. System according to claim 47, further comprising an astable multivibrator (155) having a blocking input (E);

and means (163) controlling blocking and unblocking of the astable multivibrator as a function of response of the third threshold circuit (143) and the threshold circuit means (144), the output of the astable multivibrator (155) controlling the brake valve winding (26) to repetitively, in pulsed manner, open and close the brake valve (21) to provide for gradual, slowly rising pressure increase of the pressurized brake fluid being applied to the brake cylinder (23).

51. System according to claim 50, comprising conjunctive connection means (164) having its output connected to the brake valve winding (26), the input to said conjunctive connection means being controlled by the output of the astable multivibrator (155) and the controlled connection means (51).

52. Vehicle wheel braking control system comprising means (25, 25b, 25a, 20a) supplying a brake fluid medium under pressure;

means (21, 26) controlling increase of brake fluid pressure in a wheel brake cylinder (23);

means (22, 27) controlling decrease of brake fluid pressure in the wheel brake cylinder (23);

means (93) providing a signal ($r\omega$) representative of wheel speed;

means (30) providing a signal ($r\dot\omega$) representative of wheel acceleration;

a group of at least four acceleration threshold circuits, the first circuit (41, 214) responding to negative acceleration in excess of a first level ($b_1$);

the second circuit (42, 242) responding to about 0 acceleration ($b_2$);

the third circuit (43, 243) responding to positive wheel acceleration above a third level ($b_3$);

and the fourth threshold circuit (44, 244) responding to positive wheel acceleration above a fourth level, the fourth level lying between 0 and the third level;

a low-pass filter (3, 233, 234) connected between the output of said means (30) providing a signal representative of wheel acceleration and the input to said first (41, 241) and third (43, 243) threshold circuits, and filtering stray and noise signals;

a memory circuit (51) providing an output signal, the memory circuit responding and being connected to the first threshold circuit when the first level ($b_1$) is passed in a negative direction, said output signal being connected to control said means (22, 27) controlling decrease of brake fluid pressure;

logic interconnection means (62, 72) connected to another one of said threshold circuits of the group to re-set the memory circuit (51) and remove control of decrease of brake fluid pressure from said memory circuit (51);

and further logic control circuit means interconnected from said second, third and fourth threshold circuits to the brake fluid pressure increase control means (21, 26) and the brake fluid pressure decrease control means (22, 26) selectively inhibiting flow of pressurized brake fluid to, or from, or to and from the wheel brake cylinder (23) in accordance with sensed wheel acceleration, and as wheel acceleration changes and causes response of the respective threshold circuits, said logic control circuit means being connected to effect response by the fourth threshold circuit to smoothe swings in brake fluid pressure and control decrease of brake fluid pressure when wheel acceleration has not reached the third threshold level.

53. System according o claim 52, further comprising a fifth threshold circuit responding to negative acceleration at a fifth threshold level ($b_0$), the fifth level being between 0 and the first threshold level ($b_1$), the fifth threshold circuit having its output connected in the logical control circuit to further additionally control flow of pressurized brake fluid to the wheel brake cylinder (23) and to provide an intermediate pressure response level to additionally smoothe swings in brake fluid pressure and control increase in brake fluid pressure when negative wheel acceleration has not reached the first threshold level.

54. System according to claim 52, further comprising an astable multivibrator (155) having a blocking input;

means (163) controlling unblocking of the astable multivibrator as a function of response of at least one of the third and fourth threshold circuits, the output of the astable multivibrator (155) controlling the brake fluid pressure increase control means (21, 26) to apply rapidly recurring pulses of pressurized brake fluid to the wheel brake cylinder and thus provide for gradual increase of brake fluid pressure in the wheel brake cylinder.

55. System according to claim 52, further comprising means providing a signal ($r\ddot{\omega}$) indicative of predetermined limiting values or rate of change of the acceleration signal and thus providing an output signal when the second derivative of wheel speed changes beyond a predetermined value, comprising timing means (253) energizable to measure a predetermined time interval and then provide an output signal, said timing means being connected to be energized when one of said acceleration threshold circuits (41) responds upon the acceleration signal passing the respective level;

a common response circuit (261) connected to the output of said timing means and further to the output of another one of the threshold switches to determine the time interval during which a predetermined acceleration of the wheel occurred, the output signal from the common response circuit being indicative of the second derivative of wheel speed being above or below the predetermined value.

56. Vehicle wheel braking control system comprising means (20, 25b, 25a, 20a) supplying a brake fluid medium under pressure;

controllable brake valve means (21) having a control winding (26) and applying pressurized brake fluid to a wheel brake cylinder (23);

controllable bleeder valve means (22) having a control winding (27) bleeding brake fluid from the wheel brake cylinder (23);

means (93) providing a signal ($r\omega$) representative of wheel speed;

differentiator means (30) providing a differentiated signal ($r\omega$) representative of change of wheel speed;

a time delay means including a low-pass filter (31);

a first threshold switch (41) responding to wheel deceleration exceeding a first threshold level ($b_1$) connected through said time delay means (31) to the differentiator means (30) and being connected to and controlling said bleeder valve means (22) to bleed pressurized brake fluid, and hence reduce the pressure level of brake fluid in the wheel brake cylinder (23) when said first threshold level ($b_1$), after said time delay, is exceeded;

a second threshold switch (42) responding to about zero change in wheel speed and having a second threshold level ($b_2$), said second threshold switch being connected to the differentiator means (30) without time delay and being connected to and controlling said bleeder valve means (22) to terminate bleeding of pressurized brake fluid and hence terminate reduction of the pressure level of the brake fluid in the wheel brake cylinder (23) upon failure to sense a change in speed of the wheel.

57. System according to claim 56 further comprising a third threshold switch (43) responding to a first value of wheel acceleration exceeding a third threshold level ($b_3$), and connected through said low-pass filter (31) to the differentiator means (30), and being connected to and controlling said brake valve means (21) to introduce pressurized brake fluid into the wheel brake cylinder (23) and hence increase the pressure level of brake fluid in the wheel brake cylinder (23) when said third threshold level, after said time delay, is exceeded;

means (253) determining the time interval between response of said first threshold switch (41) and response of the third threshold switch (43) to determine the time interval of re-acceleration of the wheel, and thereby provide an electrical representation of at least two differential conditions of friction between the wheel and its support surface;

and means (255) controlled by said timing means (253) controlling the rate of rise in pressure in the wheel cylinder (23) in such direction that said pressure rise will occur only gradually and slowly if a high rate of wheel reacceleration is sensed, indicative of a slippery support surface.

58. System according to claim 57 wherein the timing means comprises a monostable multivibrator (253), the rate of pressure increase control means being responsive to the comparison of the time interval between response of said first and third threshold switches (41, 43) and the unstable time of said monostable multivibrator (253).

59. System according to claim 56 further comprising a third threshold switch (43) responding to a first value of wheel acceleration exceeding a third threshold level ($b_3$) connected through said low-pass filter (31) to the differentiator means (30) and being connected to and controlling said brake valve means (21) to introduce pressurized brake fluid into the wheel brake cylinder (23) and hence increase the pressure level of brake fluid in the wheel brake cylinder (23) when said threshold level, after said time delay, is exceeded;

a fourth threshold switch (44) responding to a second value wheel acceleration ($b_4$) exceeding a fourth threshold level, the fourth value of acceleration being less than said third level and greater than zero, said fourth threshold switch (44) being connected to and controlling said brake valve means (21) and said bleeder valve means (22) to maintain the pressure level of the brake fluid in the wheel brake cylinder (23) constant, response of said third threshold switch upon further wheel acceleration overriding control by said fourth threshold switch and causing increase of the pressure level in the wheel brake cylinder.

60. System according to claim 59 further comprising a fifth threshold switch (240) responding to a low level of wheel deceleration ($b_0$) being between zero and said first threshold level ($b_1$), said fifth threshold switch being connected to and controlling said brake valve means (21) and said bleeder valve means (22) to maintain the pressure level of the brake fluid in the wheel brake cylinder (23) constant, response of another of said threshold switches, upon further rate of change of wheel speed overriding the control of said fifth threshold switch, the constant pressure level commanded by said fifth threshold switch affecting a temporal extension of the control cycle and thus a reduction of frequency of control swings.

61. System according to claim 56 further comprising a speed comparator circuit (47) responsive to the difference in speed between the circumferential speed of the wheel and the vehicle speed, said speed comparator being connected to and controlling said bleeder valve means (22) to bleed pressurized brake fluid, and hence reduce the pressure level of the brake fluid in said wheel cylinder (23) when said speed difference exceeds a predetermined value.

\* \* \* \* \*